(12) United States Patent
Yoon et al.

(10) Patent No.: US 9,692,959 B2
(45) Date of Patent: Jun. 27, 2017

(54) IMAGE PROCESSING APPARATUS AND METHOD

(71) Applicant: Samsung Electronics Co., Ltd., Suwon-si, Gyeonggi-do (KR)

(72) Inventors: Youngkwon Yoon, Seoul (KR); Hwayong Kang, Suwon-si (KR); Moonsoo Kim, Seoul (KR); Taeho Kim, Cheongju-si (KR); Jeongjin Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 14/571,901

(22) Filed: Dec. 16, 2014

(65) Prior Publication Data

US 2015/0187083 A1 Jul. 2, 2015

(30) Foreign Application Priority Data

Dec. 30, 2013 (KR) ........................ 10-2013-0166355

(51) Int. Cl.
| | |
|---|---|
| *G06T 7/00* | (2017.01) |
| *H04N 5/232* | (2006.01) |
| *H04N 5/262* | (2006.01) |
| *G06T 7/571* | (2017.01) |
| *H04N 5/369* | (2011.01) |

(52) U.S. Cl.
CPC ......... *H04N 5/23212* (2013.01); *G06T 7/571* (2017.01); *H04N 5/23235* (2013.01); *H04N 5/2621* (2013.01); *G06T 2207/10052* (2013.01); *H04N 5/3696* (2013.01)

(58) Field of Classification Search
CPC ........... H04N 5/23212; H04N 5/23235; H04N 5/2621; G06T 7/0069
See application file for complete search history.

(56) References Cited

U.S. PATENT DOCUMENTS

| | | | |
|---|---|---|---|
| 6,900,841 B1 | 5/2005 | Mihara | |
| 7,990,429 B2 * | 8/2011 | Saito | ..................... G06T 7/0081 348/222.1 |
| 9,357,120 B2 * | 5/2016 | Aoki | ........................ G02B 7/34 |
| 2004/0207747 A1 | 10/2004 | Ikeda | |

(Continued)

FOREIGN PATENT DOCUMENTS

EP 2 450 848 A1 5/2012

OTHER PUBLICATIONS

Morpho, Inc., Capture images like single-lens reflex camera with smartphone, Press Release, May 27, 2013.

*Primary Examiner* — Kim Vu
*Assistant Examiner* — Molly Delaney
(74) *Attorney, Agent, or Firm* — Jefferson IP Law, LLP

(57) ABSTRACT

An electronic device is provided. The electronic device includes an image sensor including at least one phase detection pixel, and a control unit operatively coupled to the image sensor. The control unit is configured to obtain image information and phase difference information about at least one subject through the image sensor, to identify a plurality of pieces of distance information corresponding to a plurality of regions associated with the image information, based on the phase difference information, and to process the image information, based on the distance information.

20 Claims, 16 Drawing Sheets

(56) References Cited

U.S. PATENT DOCUMENTS

| | | | |
|---|---|---|---|
| 2009/0195666 A1* | 8/2009 | Chen | G06T 5/50 348/218.1 |
| 2009/0284641 A1* | 11/2009 | Hirai | G02B 7/34 348/345 |
| 2011/0292234 A1* | 12/2011 | Mitsumoto | H04N 5/2621 348/222.1 |
| 2012/0007942 A1 | 1/2012 | Michrowski et al. | |
| 2012/0113300 A1 | 5/2012 | Hamano | |
| 2012/0147212 A1* | 6/2012 | Hara | H04N 5/235 348/223.1 |
| 2013/0050429 A1 | 2/2013 | Suzuki et al. | |
| 2013/0088621 A1 | 4/2013 | Hamada | |
| 2013/0120609 A1 | 5/2013 | Okazawa | |
| 2014/0232928 A1* | 8/2014 | Ono | G02B 27/0075 348/349 |
| 2014/0334683 A1* | 11/2014 | Masuda | H04N 5/23212 382/103 |
| 2015/0244929 A1* | 8/2015 | Lee | H04N 5/23222 348/346 |
| 2016/0042526 A1* | 2/2016 | Lee | H04N 5/23212 348/351 |

* cited by examiner

IMAGE PROCESSING APPARATUS AND METHOD

CROSS-REFERENCE TO RELATED APPLICATION(S)

This application claims the benefit under 35 U.S.C. §119(a) of a Korean patent application filed on Dec. 30, 2013 in the Korean Intellectual Property Office and assigned Serial number 10-2013-0166355, the entire disclosure of which is hereby incorporated by reference.

TECHNICAL FIELD

The present disclosure relates to an image processing apparatus and method. More particularly, the present disclosure relates to an image processing apparatus and method that include a technique for processing an image in an electronic device.

BACKGROUND

Nowadays it is possible to simultaneously take pictures by using both front and rear cameras of an electronic device and store the pictures as a single image. It is also possible to store such an image together with voice data received through a microphone equipped in the electronic device.

With a dramatic growth of technologies in the electronic component industry, the performance of a camera (e.g., a small camera module) embedded in a portable electronic device (e.g., a phone, a tablet, a small camera, etc.) is increasing. For example, an increase in the number of pixels, an adoption of an optical image stabilizer function, an improvement of a lens module, and the like allow a camera of the portable electronic device to obtain an enhanced image. Additionally, a growth of wireless communication system technologies makes it possible to share an image obtained by the portable electronic device with other persons. For example, the growth of wireless transmission technology allows more rapid transmission of high-quality images. For such reasons, the importance of a camera function in the portable electronic device becomes increased.

A remarkable growth of electronic component industry technologies allows a small-sized camera module equipped in the electronic device to obtain a high-quality image. However, due to limitations in optical characteristics of such a camera module, it is not easy to obtain an image having a lower depth of field than can be obtained in a large-sized camera module. This image with a lower depth of field may include an image having a narrow focused region. For example, if a subject is captured together with a background, the captured image may contain a less clear background image contrary to a clear subject image.

Since it is difficult for the small-sized camera module to obtain an image having a lower depth of field in comparison with the large-sized camera module due to physical limitations, a new technique to obtain an image having a lower depth of field through the small-sized camera module is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image processing apparatus and method.

In accordance with an aspect of the present disclosure, an electronic device is provided. The electronic device includes an image sensor including at least one phase detection pixel, and a control unit operatively coupled to the image sensor. The control unit is configured to obtain image information and phase difference information about at least one subject through the image sensor, to identify a plurality of pieces of distance information corresponding to a plurality of regions associated with the image information, based on the phase difference information, and to process the image information based on the distance information.

In accordance with another aspect of the present disclosure, an image processing method of an electronic device is provided. The image processing method includes obtaining image information and phase difference information about at least one subject through an image sensor including at least one phase detection pixel, identifying a plurality of pieces of distance information corresponding to a plurality of regions associated with the image information, based on the phase difference information, and processing the image information based on the distance information.

In accordance with another aspect of the present disclosure, an electronic device is provided. The electronic device includes an image sensor including at least one phase detection pixel, and a control unit operatively coupled to the image sensor. The control unit is configured to obtain image information about at least one subject through the image sensor, to obtain first phase difference information corresponding to a first region and second phase difference information corresponding to a second region among a plurality of regions associated with the image information through the at least one phase detection pixel, and to determine a blur processing for at least one of the first and second regions, based on the first phase difference information and the second phase difference information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
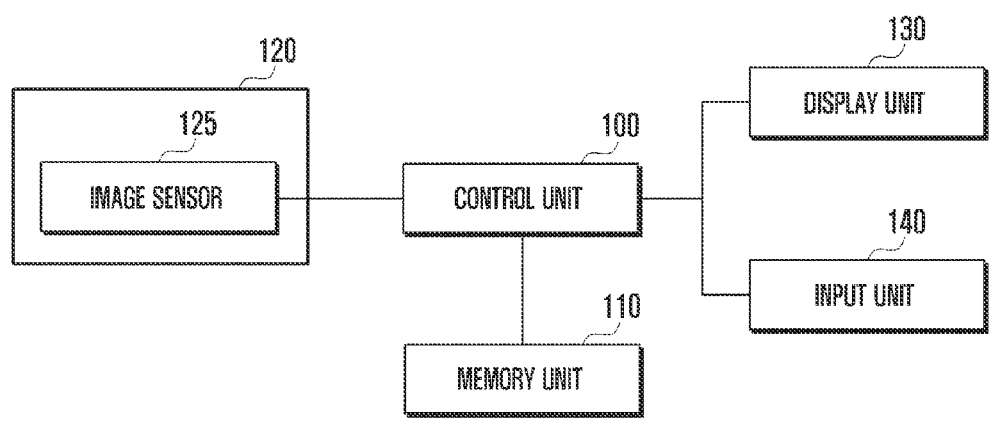
FIG. 1 is a block diagram illustrating an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a", "an", and "the" include the plural referents unless the content clearly dictates otherwise. Thus, for example, reference to "a component surface" includes reference to one or more of such surfaces.

It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element", "component", "region", "layer" or "section" discussed below could be termed a second element, component, region, layer or section without departing from the teachings herein.

The term "unit" or "module", as used herein, may refer to a software or hardware component or device which performs certain tasks. A unit or module may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

In the present disclosure, an electronic device may be a device that involves a camera function. For example, an electronic device may be a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a portable medical device, a digital camera, or a wearable device (e.g., a Head-Mounted Device (HMD), electronic glasses, electronic clothes, an electronic bracelet, an electronic necklace, an electronic appcessory, or a smart watch).

According to various embodiments of the present disclosure, an electronic device may be a smart home appliance that involves a communication function. For example, an electronic device may be a Television (TV), a Digital Video Disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to various embodiments of the present disclosure, an electronic device may be a medical device (e.g., Magnetic Resonance Angiography (MRA), Magnetic Resonance Imaging (MRI), Computed Tomography (CT), ultrasonography, etc.), a navigation device, a Global Positioning System (GPS) receiver, an Event Data Recorder (EDR), a Flight Data Recorder (FDR), a car infotainment device, electronic equipment for ships (e.g., a marine navigation system, a gyrocompass, etc.), avionics, security equipment, or an industrial or home robot.

According to various embodiments of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of the present disclosure.

An electronic device according to various embodiments of the present disclosure will be described in more detail with reference to drawings. In the following embodiments of the present disclosure, the term 'a user' may refer to a person who uses the electronic device or an apparatus (e.g., an artificial intelligence electronic device) which uses the electronic device.

The electronic device may include an image sensor (or an image sensor module) having a pixel (e.g., a phase detection pixel also referred to as a phase difference detection pixel) for detecting a phase difference. The electronic device may calculate a distance between subjects contained in a captured image and process the image having various effects. The electronic device may divide an image obtained from the image sensor into one or more sub-images (or a plurality of regions), find relative distance information between the sub-images by using phase detection pixel information corresponding to the sub-images, and process the captured image with a predetermined effect by using the distance information.

The predetermined effect may be a blur processing of the image according to a relative distance between sub-images (e.g., subjects) contained in the image. The term 'blur' refers to an expressive technique for making an image focus to a defocusing or outfocusing state. For example, when the background only is selected from an image focusing on a person with any background and then a blur processing is performed for the background, a new image having a low depth of field is obtained with a defocused background image. The term 'blur' refers to making a selected image (a background image or a person image) to a defocusing or outfocusing state. When any captured image is blur-processed, the electronic device may create different blur values based on distance information (e.g., a relative distance between subjects or a distance from the electronic device to a certain subject). For example, a blur value may be either increased or decreased in case of a sub-image having a greater value of distance information on the basis of a focused sub-image. Alternatively, blur values may be applied, depending on distance information values, to other sub-images except at least one sub-image selected by a user.

The predetermined effect may be one of various types of image filter effects depending on a relative distance between sub-images (e.g., subjects) contained in an image. The image filter effects may be based on different filter processing techniques (e.g., black-and-white, sepia, contrast, antique, vintage, pastel, sketch, etc.) differently applied to respective sub-images. Additionally, such effects may be technique to emphasize a particular color (e.g., red, blue, green, yellow, etc.) in respective sub-images.

FIG. 1 is a block diagram illustrating an electronic device according to various embodiments of the present disclosure.

Referring to FIG. 1, the electronic device may include a control unit 100, a memory unit 110, an image device 120, a display unit 130, and an input unit 140.

The control unit 100 may control the overall operation of the electronic device and also control the image device 120 including an image sensor 125. According to an embodiment of the present disclosure, the control unit 100 may perform a predetermined function for image effects in response to the output of phase detection pixels from the image sensor 125. The phase detection pixels may be upper phase sensors. The control unit 100 may calculate, from the output of the upper phase sensors, information about a relative distance between subjects for photography contained in a captured image and then process the image to have effects of the predetermined function by using the distance information. For example, the control unit 100 may divide the subjects, contained in an image outputted from color pixel sensors of the image sensor 125, into sub-images (or a plurality of regions) and detect (or obtain) the output of the upper phase sensors of the image sensor 125 respectively disposed at regions corresponding to the sub-images. Then the control unit 100 may calculate (or identify) information about a relative distance between the sub-images by analyzing the output of the upper phase sensors and then process the image, using (or based on) a distance value obtained from the relative distance information. The control unit 100 may include hardware having at least one processor and software for controlling such hardware.

The memory unit 110 may store therein the captured image and/or the processed image. The memory unit 110 may include an internal memory and/or an external memory.

The image device 120 which includes the image sensor 125 may detect an image through the image sensor 125 and convert the detected image into an electric signal to form digital data. The image sensor 125 may be formed of at least one color pixel sensor (a color pixel or an image pixel) and at least one upper phase sensor (a phase detection pixel). The color pixel sensor may include at least one of red, green, or blue pixel. The color pixel sensor may obtain images of a subject for photography. The upper phase sensor may be disposed on at least part of the entire region of the image sensor 125. The upper phase sensor may also obtain phase information depending on a relative distance between subjects contained in a captured image.

The display unit 130 may display images captured by the image device 120. The display unit 130 may be formed of a Liquid Crystal Display (LCD), a Light Emitting Diode (LED) display, or the like. The input unit 140 may receive a user's input action for controlling the electronic device or entering data and then create a corresponding input signal. The display unit 130 and the input unit 140 may be integrated together in the form of a touch screen.

Figure 2:
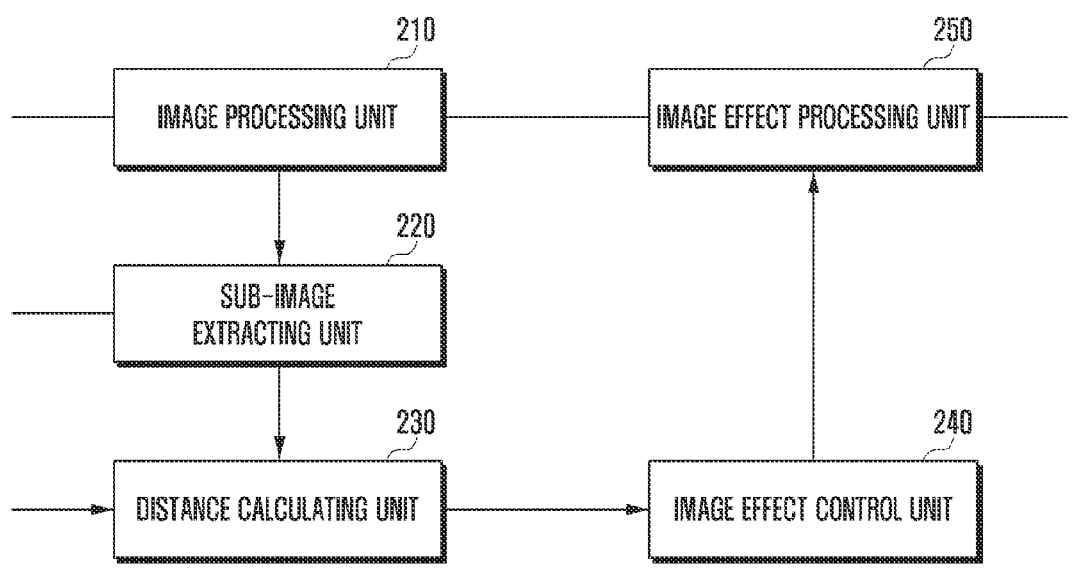
FIG. 2 is a block diagram illustrating sub-elements of a control unit used for calculating distance information of an electronic device according to various embodiments of the present disclosure.

FIG. 2 is a block diagram illustrating sub-elements of a control unit used for calculating distance information of an electronic device according to various embodiments of the present disclosure. Calculation of distance information may be performed using hardware shown in FIG. 2 or using software.

Referring to FIG. 2, an image signal processing unit 210 may process images detected at color pixel sensors (e.g., image pixel 520 in FIG. 5) of the image sensor 125. A sub-image extracting unit 220 extracts respective sub-images from the entire image processed by the image signal processing unit 210. Each sub-image may correspond to each subject for photography. For example, the first sub-image may be a specific image region corresponding to the first subject (e.g., subject 410 in FIGS. 4A, 4B, and 4C). Similarly, the second sub-image may be a specific image region corresponding to the second subject (e.g., subject 420 in FIGS. 4A, 4B, and 4C), and the third sub-image may be a specific image region corresponding to the third subject (e.g., subject 430 in FIGS. 4A, 4B, and 4C). The fourth sub-image may be a specific image region corresponding to the fourth subject (e.g., background).

A distance calculating unit 230 may receive a signal from the upper phase sensor (or the phase detection pixel) of the image sensor 125 or a signal from the sub-image extracting unit 220. According to an embodiment of the present disclosure, the distance calculating unit 230 may calculate (or obtain) relative distance information of respective sub-images by analyzing the output of the phase detection pixels (e.g., phase detection pixel 510 in FIG. 5) of regions where the sub-images are located. The distance calculating unit 230 may obtain the relative distance information, based on an output value of the phase detection pixel. For example, the phase detection pixel may include the first focus region for detecting that a focus for the subject is located at the image sensor module, the second focus region for detecting that a focus for the subject is located between the image sensor module and the subject, and the third focus region for detecting that a focus for the subject is located at the other region. The phase detection pixel may output different values based on images formed at the first to third focus regions. The distance calculating unit 230 may calculate the relative distance information on the basis of output values from the phase detection pixels of regions corresponding to sub-images.

An image effect control unit 240 may create effect control data to be used for processing image effects of sub-images, based on distance information values of sub-images outputted from the distance calculating unit 230. If the image effect is a blur effect, the control unit 100 may have depth map data based on distance information values. The image effect control unit 240 may calculate a difference value (e.g., df1 and/or df2 in FIG. 6D) of distance information defocused between a specific sub-image of a focus position and the other image according to the distance information values outputted from the distance calculating unit 230, and create blur control data according to the calculated difference value from the depth map.

An image effect processing unit 250 may receive image data from the image signal processing unit 210 and receive effect control data from the image effect control unit 240. Also, using the received effect control data, the image effect processing unit 250 may process the effects of sub-images contained in the received image data. If such an effect is a blur, the image effect processing unit 250 may process each sub-image, contained in the image, to be blurred using blur control data.

Figure 3:
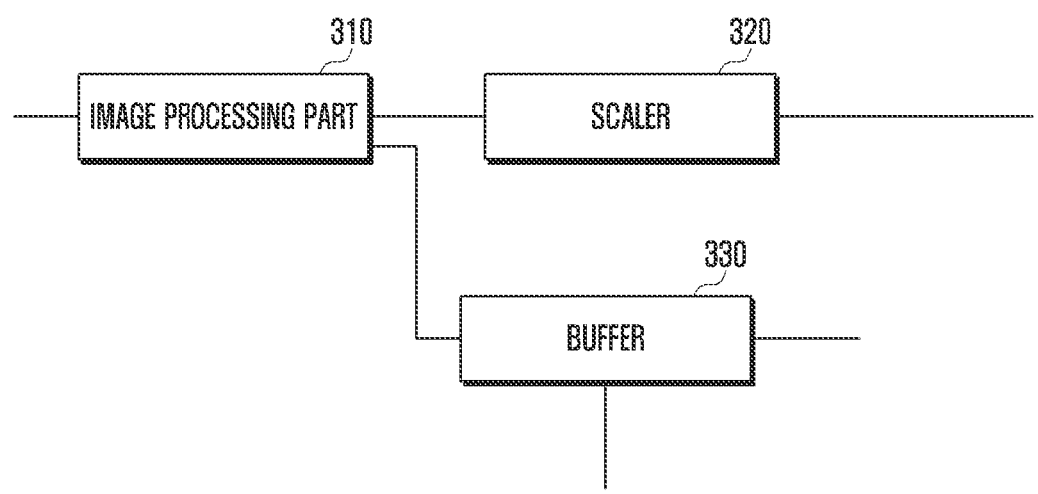
FIG. 3 is a block diagram illustrating an image signal processing unit according to various embodiments of the present disclosure.

FIG. 3 is a block diagram illustrating the image signal processing unit according to various embodiments of the present disclosure.

Referring to FIG. 3, an image processing part 310 according to an embodiment of the present disclosure may include a pre-processor and a post-processor. The pre-processor performs a pre-processing of a full resolution image obtained from the image sensor 120. The pre-processor may extract and process 3A (Auto White Balance (AWB), Auto Exposure (AE), and Auto Focusing (AF)) from an image outputted from the color pixel sensors of the image sensor 125, and perform a lens shading compensation, a dead pixel, a knee correction, and the like. The post-processor may have a color interpolator, an image processing chain (IPC), and an image converter. The color interpolator may perform a color interpolating function to convert an image (i.e., Bayer data) outputted from the image sensor 120 into a color image. The IPC may perform a noise reduction, a gamma correction, a luminance correction, and the like with regard to the color-interpolated images. The image converter converts the post-processed image into a Y-signal, U-signal, and V-signal (YUV) image. For example, the post-processor may perform a function to color-interpolate and post-process a resized and scaled image and then convert it into a YUV image.

A scaler 320 scales up or down a full resolution image outputted from the image processing unit 310 to have a volume and size suitable for the display unit 140. This scaling may be performed using decimation or using both interpolation and decimation to meet a screen ratio of the display unit 130. An image outputted from the scaler 320 may be displayed as a preview image on the display unit 130.

A buffer 330 temporarily stores an image outputted from the image processing unit 310. The buffer 330 may have a ring buffer structure, and buffers images equal to the number of frames predefined for a preview mode. This buffered image in the preview image is used to realize a zero shutter lag at a still image capture. Accordingly, when a capture of a still image is required, the control unit 100 selects and outputs a specific image for compensating a zero shutter lag time among images stored in the buffer 330 (e.g., a previous image of three-frame ahead among images in the buffer 330 if the zero shutter lag is three frames). Additionally, the buffer 330 performs a buffering of one or more images captured under the control of the control unit 100 and outputs the buffered images to the sub-image extracting unit 220.

Figure 4A:
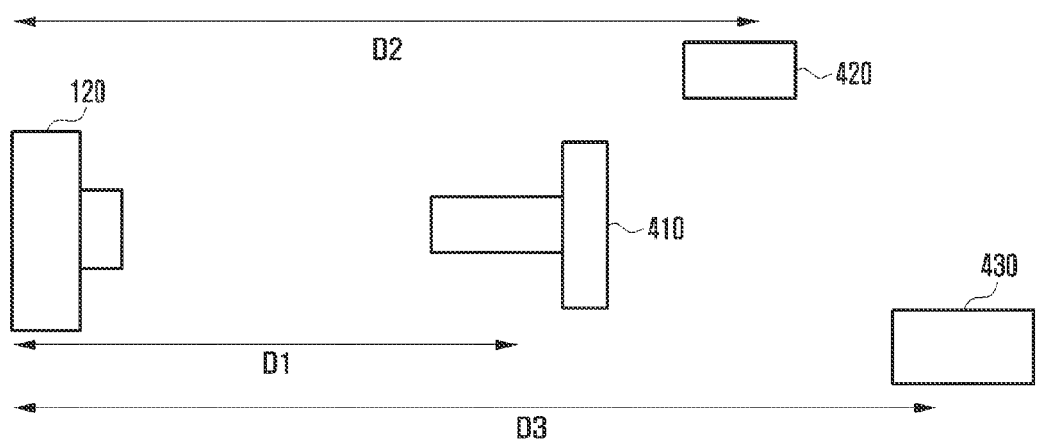
FIGS. 4A, 4B, and 4C show examples of locations of subjects for photography according to various embodiments of the present disclosure.
Figure 4B:
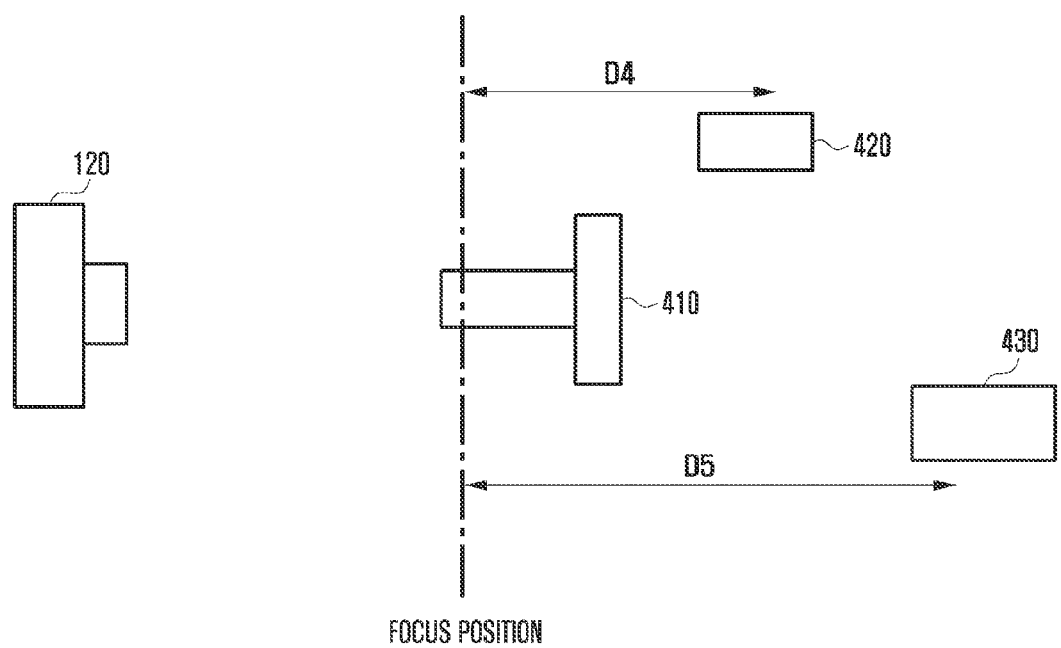
Figure 4C:
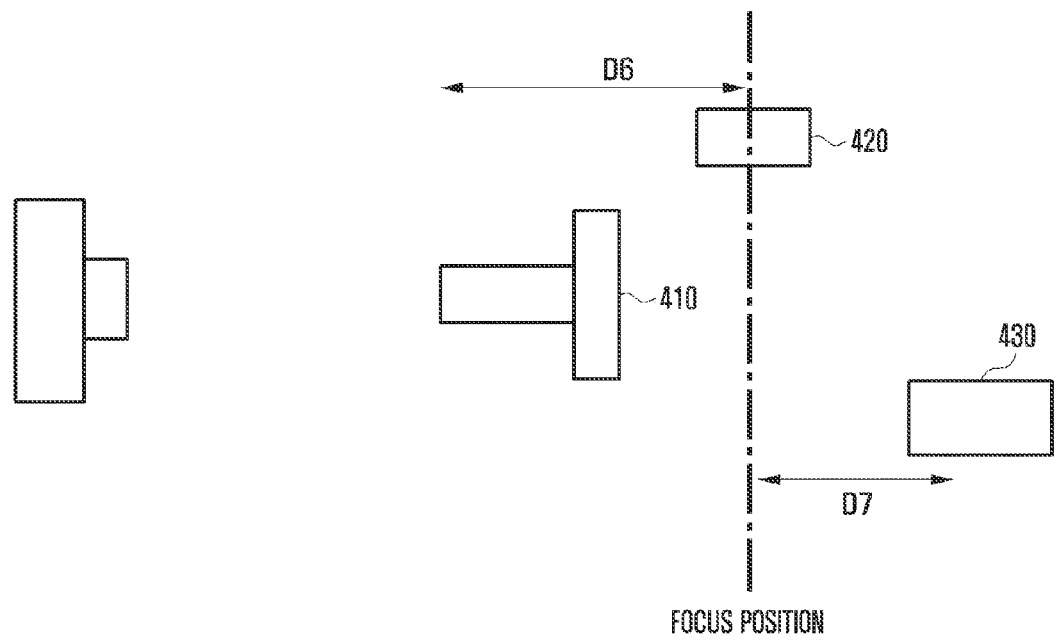

FIGS. 4A, 4B, and 4C show some examples of locations of subjects for photography according to various embodiments of the present disclosure.

Referring to FIGS. 4A-4C, when subjects 410, 420 and 430 are disposed in the front of the image device 120 as shown in FIG. 4A, a user can take a photograph focusing on a desired subject as shown in FIG. 4B or 4C. FIG. 4A shows an example in which a subject 410 is placed at the nearest position having a distance D1 from the image device 120 and a subject 430 is placed at the farthest position having a distance D3 from the image device 120. If a user takes a photograph by focusing on a certain subject in a state as shown in FIG. 4A, the focused subject may be reproduced as a clear image in a captured image, and the other subjects may be reproduced as less clear images in proportion to a distance from the focused subject.

FIG. 4B shows an example of focusing on the nearest subject 410, and FIG. 4C shows an example of focusing on the middle subject 420. In case of FIG. 4B, an image of the subject 410 may be clear, whereas images of the subjects 420 and 430 respectively having distances D4 and D5 from the subject 410 may be less clear. The subject 430 may be captured as a relatively less clear image than the subject 420. Similarly, in FIG. 4C, an image of the subject 420 may be clear, and images of the subjects 410 and 430 respectively having distances D6 and D7 from the subject 420 may be less clear. The subject 410 having a relatively greater distance may be captured as a less clear image than the subject 430.

As discussed above, the phase detection pixel of the image sensor 125 outputs different phase values with regard to the first focus region corresponding to a case where a focus for the subject is located at the image sensor module, the second focus region corresponding to a case where a focus for the subject is located between the image sensor module and the subject, and the third focus region corresponding to a case where a focus for the subject is located at the other region. For example, in FIG. 4C case in which a focus is placed on the subject 420, the subject 420 is in the first focus region, the subject 410 may be in the second focus region, and the subject 430 may be in the third focus region.

Figure 5:
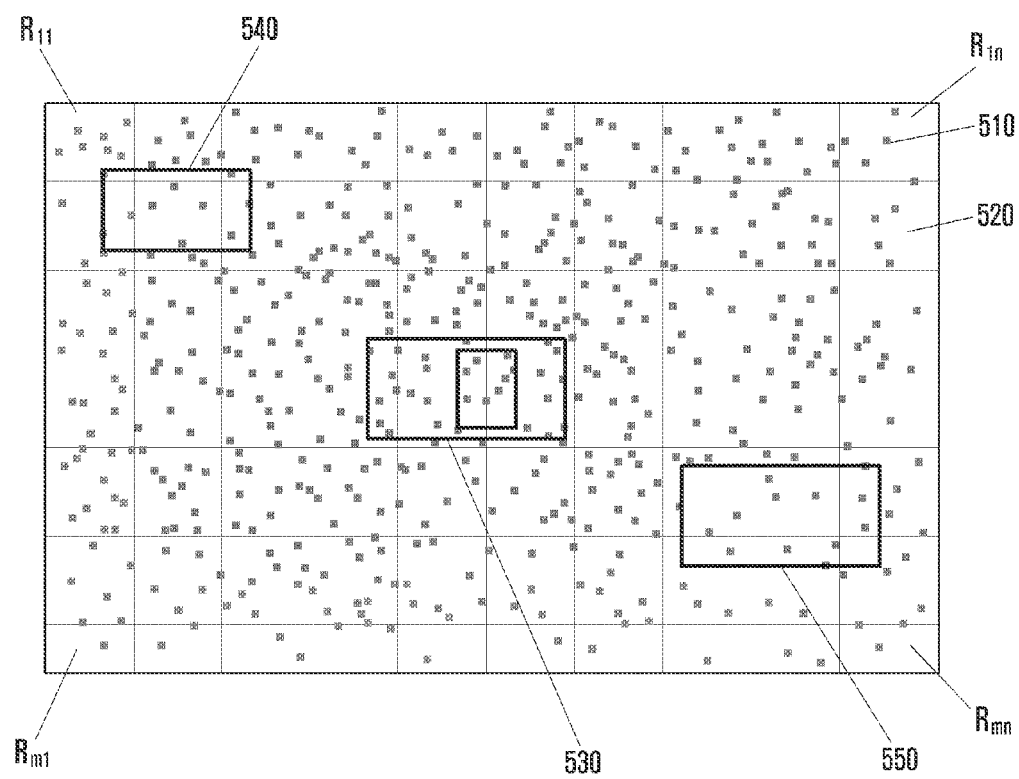
FIG. 5 shows an image sensor according to various embodiments of the present disclosure.

FIG. 5 shows an image sensor according to various embodiments of the present disclosure.

Referring to FIG. 5, the image sensor 125 may include at least one phase detection pixel 510 (e.g., an upper phase sensor) and at least one image pixel 520 (e.g., a color pixel). In the image sensor, the first image 530 corresponding to the first subject 410 the second image 540 corresponding to the second subject 420 and the third image 550 corresponding to the third subject 430 may be formed. According an embodiment of the present disclosure, the control unit 100 may obtain relative distance information about the subjects 410, 420, and 430, images of which are formed in the image sensor, based on phase values detected by at least one phase detection pixel. For example, based on a value of at least one phase detection pixel included in the first image 530, the control unit 100 may obtain a distance up to the first subject. If a value of the phase detection pixel corresponding to the first image 530 corresponds to the first focus region, then the control unit 100 may determine that a focus is placed on the first image 530, and then obtain a distance up to the first subject corresponding to the first image 530 on the basis of a lens distance system (e.g., approximately 2 m). Alternatively, the control unit 100 may divide the image sensor 125 into sub-regions from R11 to Rmn (or a plurality of regions) and, based on values of the phase detection pixels contained in the respective sub-regions, obtain a distance between respective subjects corresponding to the respective sub-regions. For example, if a value of the phase detection pixel corresponding to the first image 530 has a value corresponding to the first focus region, and if a value of the phase detection pixel corresponding to the second image 540 has a value corresponding to the second focus region, then the control unit 100 may obtain a relative distance between the first and second images 530 and 540.

Figure 6A:
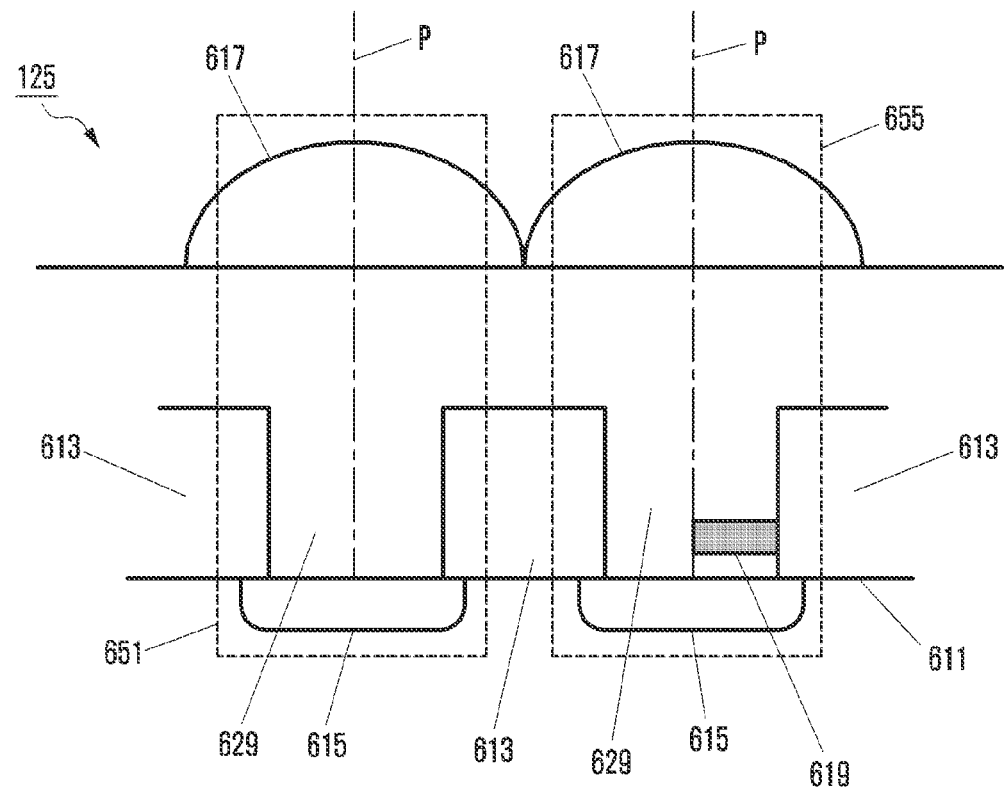
FIGS. 6A and 6B show a partially enlarged view of an image device according to various embodiments of the present disclosure.
Figure 6B:
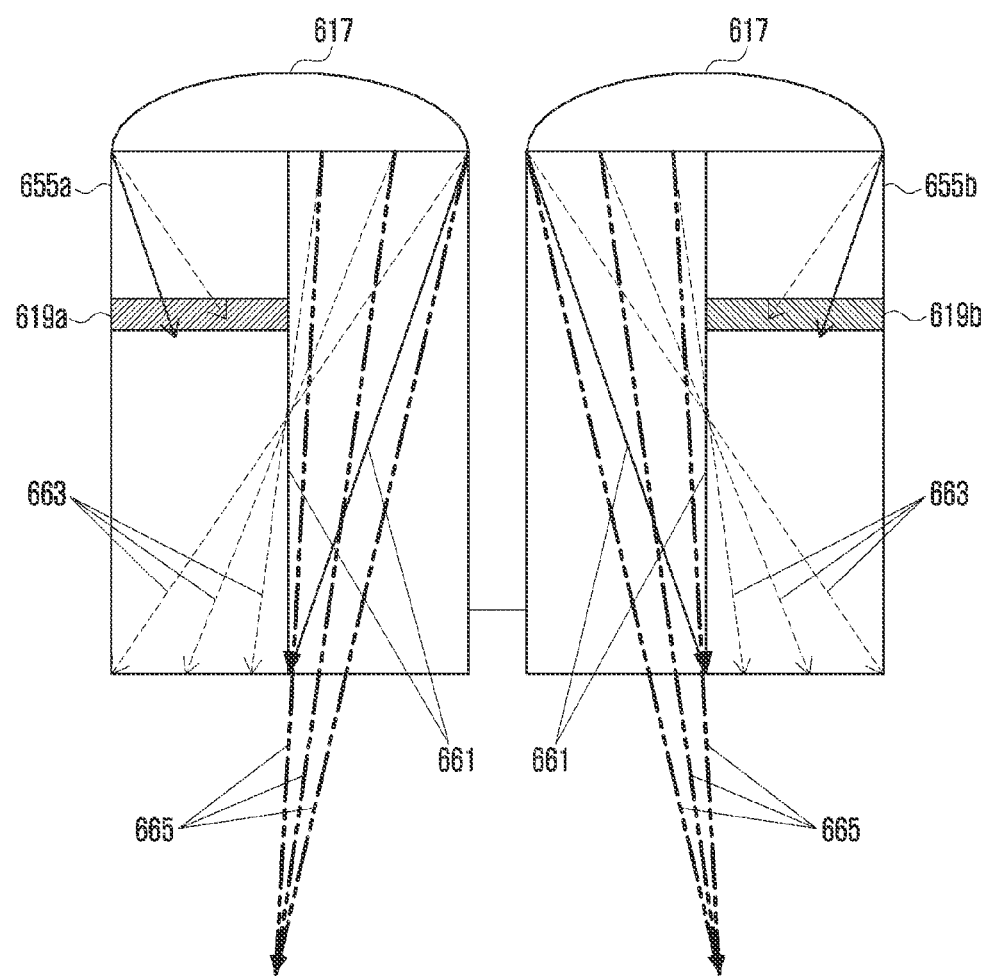

FIGS. 6A and 6B show a partially enlarged view of an image device according to various embodiments of the present disclosure.

Referring to FIG. 6A, pixels 651 and 655 forming the image sensor (e.g., 125 in FIG. 1) may include a wiring region 613, a light-receiving region 615, and an image-forming lens 617 (e.g. a micro lens).

The wiring regions 613 may be disposed at regular intervals on a substrate 611 of the image sensor 125, and the light-receiving regions 615 may be disposed between the respective adjacent wiring regions 613. For example, the wiring regions 613 and the light-receiving regions 615 may be arranged by turns on the substrate 611. The wiring regions 613 may have power or signal lines and transistors or any other device disposed therein. The light-receiving regions 615 which are photoelectric transformation regions for detecting light and transforming it into an electric signal may deliver the electric signal to the wiring regions 613.

Each of the pixels, i.e., a unit pixel, 651 and 655 may include the single light-receiving region 615, the wiring region 613 connected with the light-receiving region 615 and having therein a wiring pattern and a transistor, and the micro lens 617 disposed over and corresponding to the light-receiving region 615. Some of the unit pixels (e.g., 651) may operate as an image detection pixel (e.g., a color pixel), and some of the unit pixels (e.g., 655) may be formed of a phase focus detection pixel (also referred to as a phase difference focus detection pixel) having a phase separation structure.

The phase focus detection pixel 655 may have a phase separation structure in which a light barrier 619 is equipped on the light-receiving region 615. Each micro lens 617 may be disposed such that an optical axis (P) thereof can coincide with the corresponding light-receiving region 615. A cavity 629 is formed on the light-receiving region 615 between the adjacent wiring regions 613, and the light barrier 619 may be disposed in the cavity 629. The light barrier 619 may cover a part (e.g., half) of the light-receiving region 615 to partially block incident light onto the light-receiving region 615.

Referring to FIG. 6B, the phase focus detection pixel 655 may form a pair 655a and 655b which are adjacent to and separated from each other. A light barrier 619a disposed on the first phase focus detection pixel 655a may be placed at a non-overlapped position (e.g., an offset position) with another light barrier 619b disposed on the second phase focus detection pixel 655b. If the first phase focus detection pixel 655a detects light passing through a part of an exit pupil of the micro lens 617, the second phase focus detection pixel 655b may detect light passing through the other part of the exit pupil. The image sensor 125 and/or any electronic device, such as a camera or a mobile terminal, having the image sensor 125 may measure a focus adjustment state of the image sensor 125 by comparing values detected from the respective phase focus detection pixels 655 with each other.

According to an embodiment of the present disclosure, the phase focus detection pixel may output different values, depending on the first focus state (e.g., shown as a solid line 661) corresponding to a case where a focus for the subject is located at the image sensor 125, the second focus state (e.g., shown as a dotted line 663) corresponding to a case where a focus for the subject is located between the image sensor 125 and the subject, and the third focus state (e.g., shown as a two-dot chain line 665) corresponding to a case where a focus for the subject is located at the other region. Based on such a focus state, the electronic device may identify a relative distance between subjects.

In order to explain the structure and operation of the phase detection pixel, the phase focus detection pixel having the light barrier is shown in FIGS. 6A and 6B. Alternatively, any other phase detection pixel having various phase separation structures may be used.

As discussed above, when an image is captured using the image device 120, a focus region is placed at a desired subject, and the phase detection pixel (e.g., the upper phase sensor) 510 disposed in the image sensor 125 can extract distance information between a focused subject and any other subject. At this time, the control unit 100 may find a phase difference value from each pair of the phase detection pixels (or the upper phase sensors) 510 or using the phase detection pixels (or the upper phase sensors) corresponding to respective sub-regions of the image sensor 125 as shown in FIG. 5.

Hereinafter, it will be supposed that distance information about subjects is calculated using the phase detection pixels corresponding to respective sub-regions as shown in FIG. 5. An image may contain two or more subjects. For calculation of distance information about such subjects, the control unit 100 may find a distance between a focused subject and a non-focused subject (e.g., focused in the front or rear of the subject).

Figure 7A:
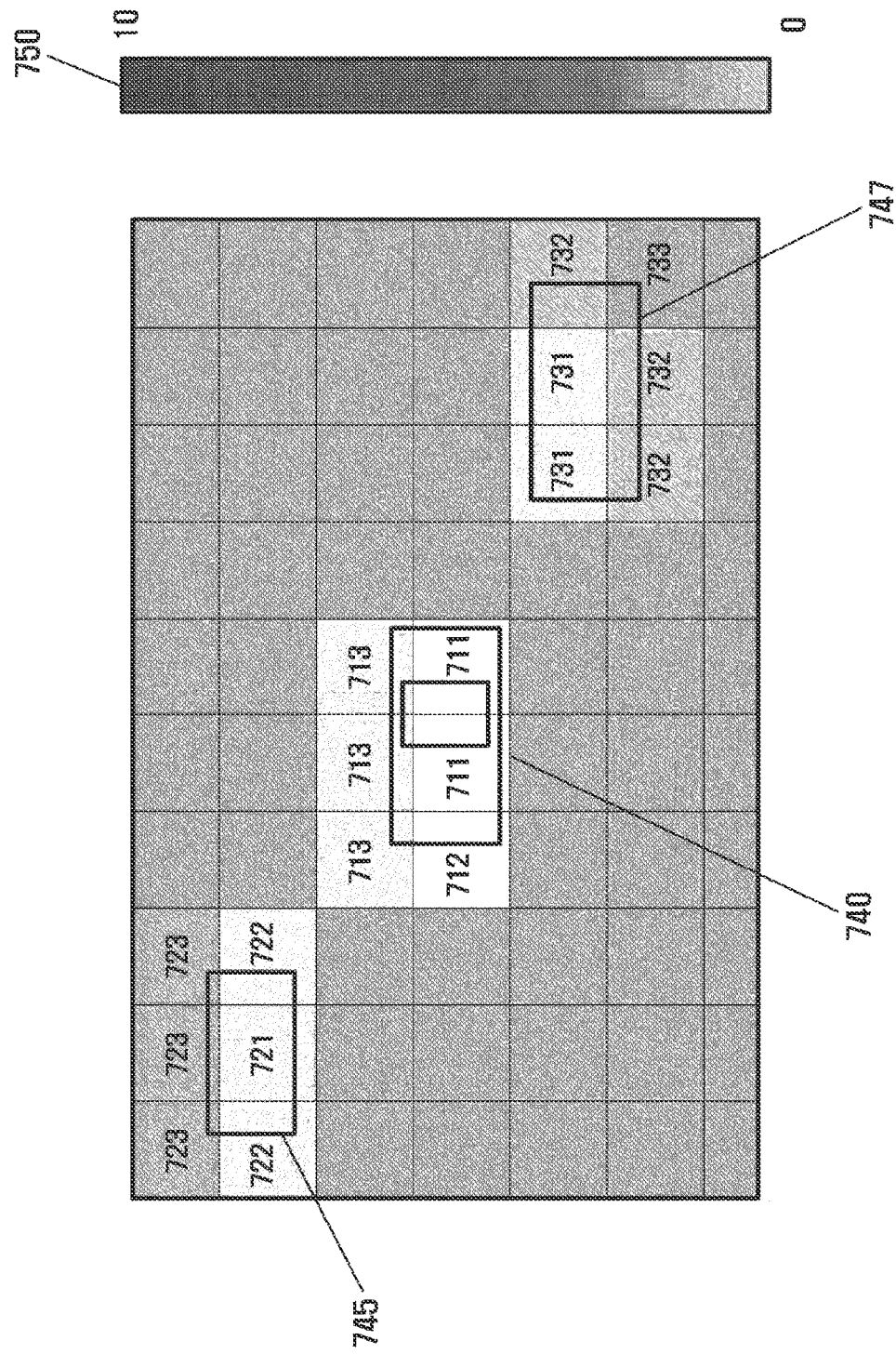
FIGS. 7A and 7B are views illustrating an operation of controlling sub-image effects according to various embodiments of the present disclosure.
Figure 7B:
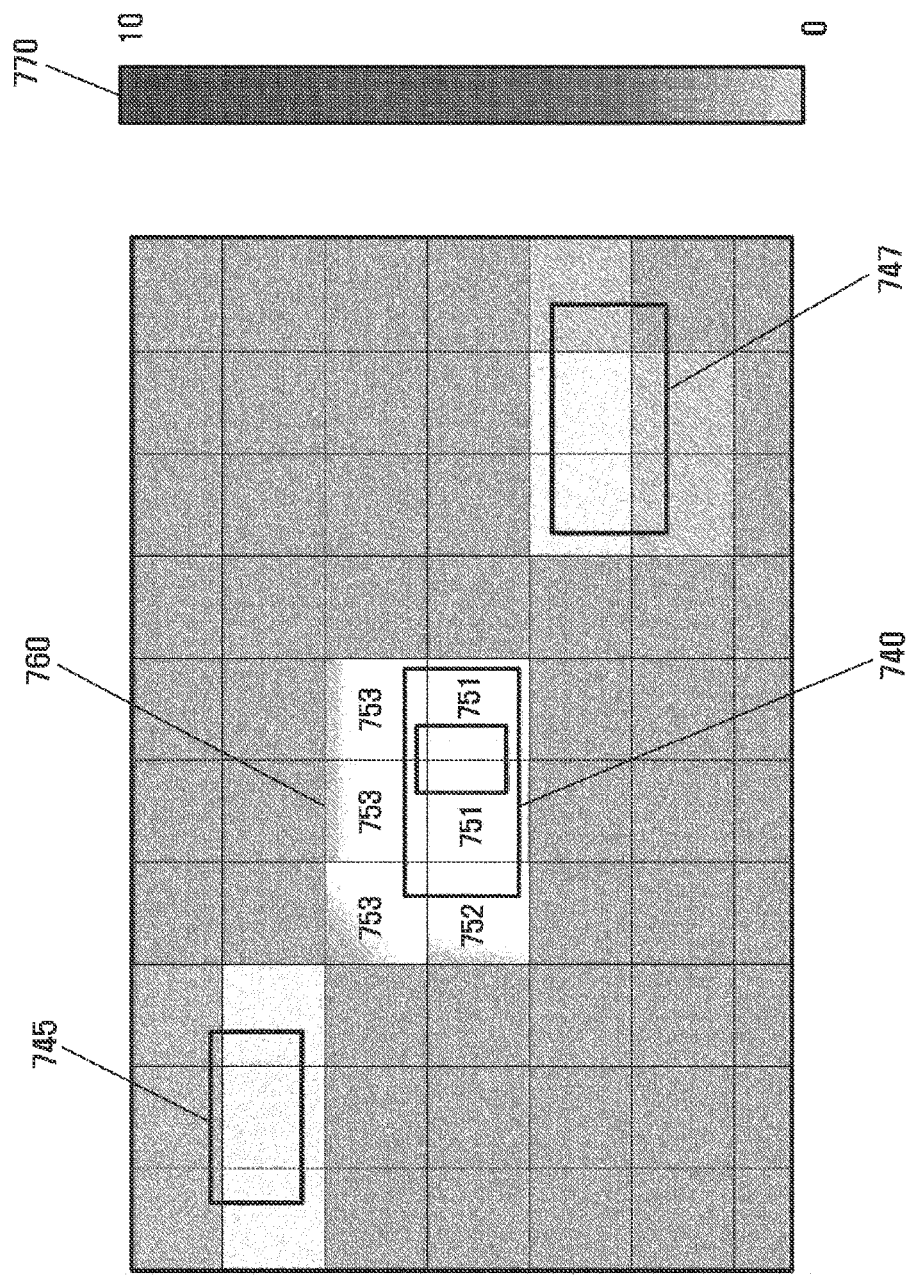

FIGS. 7A and 7B are views illustrating an operation of controlling sub-image effects according to various embodiments of the present disclosure. FIG. 7A shows an example in case a single sub-region has a single value, and FIG. 7B shows an example of a blur processing in case a single sub-region has a plurality of values. An image effect may mean a blur processing of sub-images (i.e., processing sub-images to be blurred) using relative distance information between sub-images.

Referring to FIG. 7A, when distance information values between sub-images are received from the distance calculating unit 230, the image effect control unit 240 may find relative distance information between a focused sub-image and any other sub-image, create control data for a blur-processing of the sub-images based on relative distance information, and output the created control data to the image effect processing unit 250. For example, in FIG. 7A, a sub-image 740 is a focused image, and sub-images 745 and 747 are non-focused images (e.g., an image having a focus located in the front of the subject). Referring to FIG. 7A, reference numeral 750 indicates an example of depth. A depth map may indicate a relative distance between sub-images. A depth map table may record control data to be used for processing (e.g., blur processing) an image by the image effect control unit 240 according to a determined depth.

When a photograph is taken, an image gap projected the image sensor 125 is varied according to a relation between the subject (i.e., a sub-image) and a focus position, and phase sensors of the image sensor 125 may detect and output a phase difference depending on a gap between images detected from corresponding sub-regions (from R11 to Rmn in FIG. 5). At this time, the phase sensors located at sub-regions 711 to 713 of the focused sub-image 740 generate specified phase difference values, and the phase sensors located at non-focused sub-regions 721 to 723 and 731 to 733 generate phase difference values depending on defocused sizes. The sub-images 745 and 747 have focus positions placed behind, and the sub-region of the sub-image 747 may have a greater phase difference value than that of the sub-image 745. The distance calculating unit 230 may calculate distance information values of sub-images by phase difference values of the phase detection pixels. The image effect control unit 240 may find relative distance information of respective sub-images, convert the distance information into control data in the depth map table, and output the control data to the image effect processing unit 250.

The distance calculating unit 230 may calculate a distance between sub-images by using phase difference values outputted from the phase detection pixels and then find a depth map by using a relative distance between the sub-images. This may be represented as shown in FIG. 7A. According to an embodiment of the present disclosure, when two or more pieces of distance information are detected from the sub-region, it is possible to find distance information about the sub-region on the basis of the detected distance information. The accuracy of the depth map may be applied differently according to the size of the sub-region, and any space with no information may be filled through interpolation technique.

According to an embodiment of the present disclosure, a single sub-region may have one or more phase difference values. For example, in FIG. 7B, a sub-image 740 having sub-regions 752 and 753 includes a region where a subject 410 is located and a region where the subject 410 is not located. Therefore, each of the sub-regions 752 and 753 may have two or more phase difference values. In this case, the image effect control unit 100 may subdivide the sub-region having two or more phase difference values (e.g., the sub-region having two or more pieces of distance information) by using value of adjacent sub-regions or image characteristics (e.g., edge distribution, color distribution, etc.) in the sub-region or between adjacent sub-regions. For example, the sub-region 752 may have at least two pieces of distance information. The sub-region 752 may contain the first region corresponding to the subject (e.g., 410) and the second region corresponding to the background. The distance calculating unit 230 may extract the outline of the subject 410 through image processing within the sub-region 752. The distance calculating unit 230 may distinguish the subject 410 from the background and estimate distance information through at least one of the outline of the subject 410, distance information of sub-regions adjacent to the sub-region 752, a plurality of pieces of distance information obtained in the sub-region (e.g., values of phase detection pixels), or any additional image analysis for the sub-region 752 (e.g., a color analysis, a contrast analysis, etc.). Based on results of estimation, the distance calculating unit 230 may allow the sub-region 752 to have a plurality of distance information values. Image processing technique for the sub-region 752 may be equally applied to the sub-region 753 and respective sub-regions of the subjects 420 and 430.

According to an embodiment of the present disclosure, control data for blur processing of images is determined by applying relative distance information between sub-images to a depth map table, and the determined control data is outputted to the image effect processing unit 250. At this time, the control data may be used for blur-processing respective sub-images contained in a captured photo image as different values.

The image effect processing unit 250 controls an image processing according to control data values corresponding to the respective sub-images 410 to 430 contained in the photo image outputted to the image signal processing unit 210 as shown in FIG. 7B. The control data may be Gaussian blur values, and the image effect processing unit 250 may be a Gaussian filter. Referring to FIG. 7B, a gradation processing 760 may be performed for the subject 410 such that the subject 410 is not too much different from adjacent sub-regions. In case a photo having a lower depth of field is taken, blur values are not discrete at a boundary between the subject and the background. The subject and the background may be gradually separated from each other in the form of Gaussian blur. Such a continuous and gradual separation based on a blur processing between the subject and the background may create a soft and natural image.

The image effect control unit 240 may blur-process a captured image according to relative distance information between sub-images. Alternatively or additionally, the image effect control unit 240 may control various type effects other than a blur processing. For example, different type color filtering operations may be performed for processing respective sub-images. The image effect control unit 240 may identify the respective subjects 410, 420 and 430 by using distance information of such subjects, give a black-and-white effect to the subject 410, give a sepia effect to the subject 420, and give a blue emphasis effect to the subject 430. The image effect control unit 240 may give a blur effect to the focused subject 410 and give a sharpen effect to the non-focused subject 420.

Figure 8:
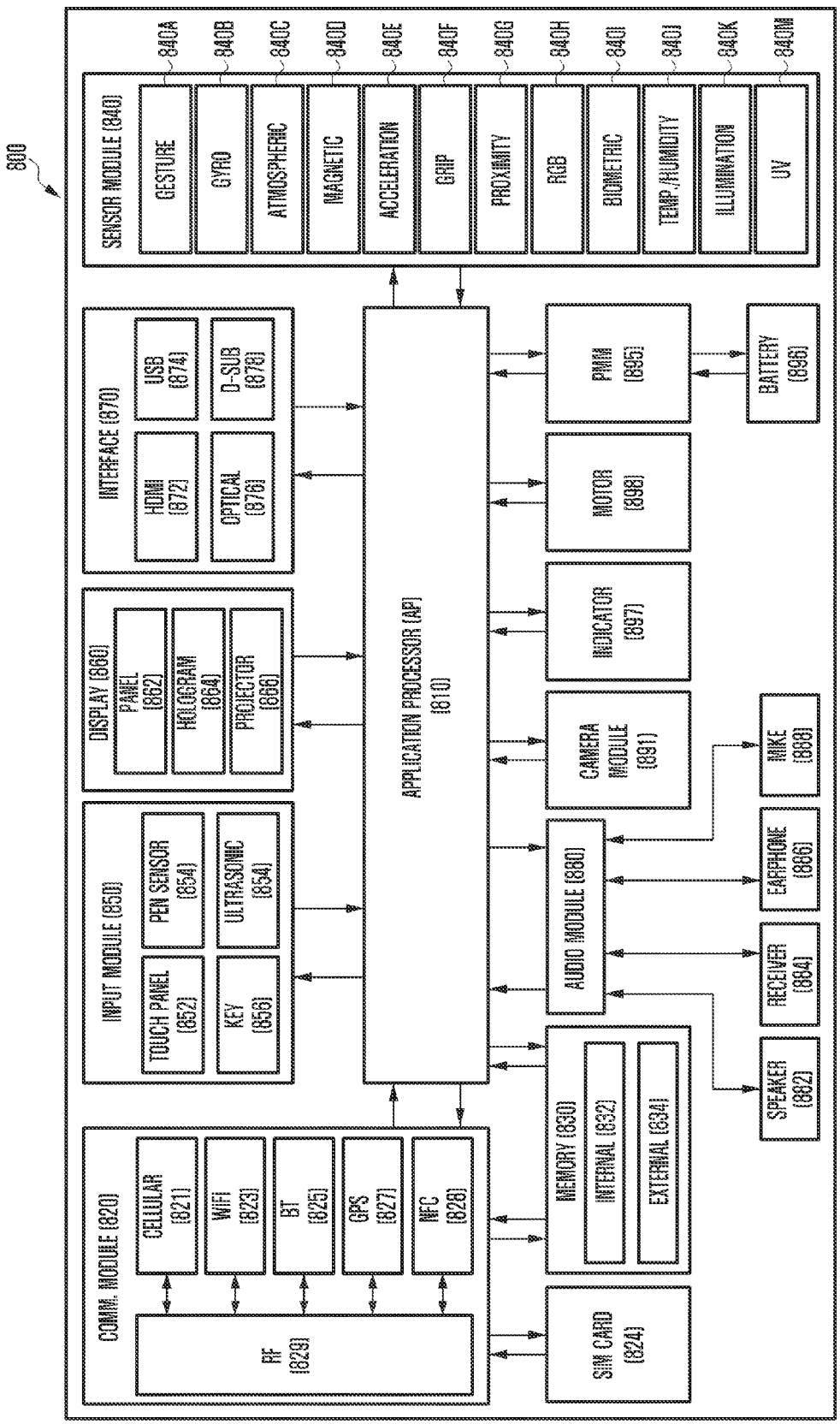
FIG. 8 is a block diagram of an electronic device according to various embodiments of the present disclosure.

FIG. 8 is a block diagram of an electronic device according to various embodiments of the present disclosure. FIG. 8 shows an apparatus that can process a captured image to have a predetermined effect depending on distance information.

Referring to FIG. 8, the electronic device 800 may include at least one Application Processor (AP) 810, a communication module 820, at least one subscriber identity module (SIM) card 824, a memory 830, a sensor module 840, an input module 850, a display 860, an interface 870, an audio module 880, a camera module 891, a power management module 895, a battery 896, an indicator 897, and a motor 898.

The AP 810 may drive an operating system or an application program to control a plurality of hardware or software components connected to the AP 810, and may perform processing and operations of various data including multimedia data. The AP 810, for example, may be implemented as a System on Chip (SoC). According to an embodiment of the present disclosure, the AP 810 may further include a graphic processing unit (GPU) (not shown).

The communication module 820 may perform data transmission/reception in communication with other electronic devices connected to the electronic device through a network. The communication module 820 may include a cellular module 821, a WiFi module 823, a Bluetooth (BT) module 825, a GPS module 827, a near-field Communication (NFC) module 828, and a Radio Frequency (RF) module 829.

The cellular module 821 may provide a voice call, a video call, a Short Message Service (SMS), an Internet service, and the like through a communication network (e.g., Long Term Evolution (LTE), LTE-Advanced (LTE-A), Code Division Multiple Access (CDMA), Wideband CDMA (WCDMA), Universal Mobile Telecommunications System (UMTS), WiBro, or Global System for Mobile Communications (GSM)). The cellular module 821 may identify and authenticate an electronic device in a communication network by using, for example, a subscriber identification module (e.g., the SIM card 824). The cellular module 821 may perform at least some of the functions that may be provided by the AP 810. For example, the cellular module 821 may perform at least a multimedia control function.

According to an embodiment of the present disclosure, the cellular module 821 may include a communication processor (CP). The cellular module 821, for example, may be implemented as an SoC. Although the cellular module 821 (e.g., a CP), the memory 830, the power management module 895, and the like are shown as separate elements from the AP 810 in FIG. 8, the AP 810 may be implemented to include at least some (e.g., the cellular module 821) of the aforementioned elements according to an embodiment of the present disclosure.

According to an embodiment of the present disclosure, the AP 810 or the cellular module 821 (e.g., a CP) may load a command or data received from at least one of a non-volatile memory and other elements connected thereto into a volatile memory and process the loaded command or data. The AP 810 or the cellular module 821 may store data received from or generated by at least one of other elements in a non-volatile memory.

Each of the WiFi module 823, the BT module 825, the GPS module 827, and the NFC module 828, for example, may include a processor for processing data transmitted or received through the corresponding module. Although the cellular module 821, the WiFi module 823, the BT module 825, the GPS module 827, and the NFC module 828 are shown as separate blocks in FIG. 2, at least some (e.g., two or more) of the cellular module 821, the WiFi module 823, the BT module 825, the GPS module 827, and the NFC module 828 may be included in one integrated chip (IC) or one IC package according to an embodiment of the present disclosure. For example, at least some of processors corresponding to the cellular module 821, the WiFi module 823, the BT module 825, the GPS module 827, and the NFC module 828 respectively (e.g., a CP corresponding to the cellular module 821 and a WiFi processor corresponding to the WiFi module 823) may be implemented as one SoC.

The RF module 829 may perform data transmission/reception, for example, RF signal transmission/reception. Although not shown, the RF module 829, for example, may include a transceiver, a power amp module (PAM), a frequency filter, a low noise amplifier (LNA), and the like. The RF module 829 may further include a component for transmitting/receiving an electromagnetic wave over the air in wireless communication, such as a conductor or a conducting wire. Although FIG. 8 shows that the cellular module 821, the WiFi module 823, the BT module 825, the GPS module 827, and the NFC module 828 share one RF module 829, at least one of the cellular module 821, the WiFi module 823, the BT module 825, the GPS module 827, and the NFC module 828 may perform RF signal transmission/reception through a separate RF module according to an embodiment of the present disclosure.

The at least one SIM card 824 may be a card including a subscriber identification module, and may be inserted into at least one slot formed in a certain position of the electronic device. The at least one SIM card 824 may include unique identification information (e.g., integrated circuit card identifier (ICCID)) or subscriber information (e.g., international mobile subscriber identity (IMSI)).

The memory 830 (e.g., the memory unit 110) may include an internal memory 832 or an external memory 834. The internal memory 832, for example, may include at least one of a volatile memory (e.g., a dynamic Random Access Memory (DRAM), a static RAM (SRAM), or a synchronous dynamic RAM (SDRAM)) and a non-volatile memory (e.g., a one-time programmable Read Only Memory (OTPROM), a programmable ROM (PROM), an erasable and programmable ROM (EPROM), an electrically erasable and programmable ROM (EEPROM), a mask ROM, a flash ROM, a Not And (NAND) flash memory, or a Not Or (NOR) flash memory).

According to an embodiment of the present disclosure, the internal memory 832 may be a solid state drive (SSD). The external memory 834 may further include a flash drive, for example, a compact flash (CF), a secure digital (SD), a micro secure digital (Micro-SD), a mini secure digital (Mini-SD), an extreme digital (xD), or a memory stick. The external memory 834 may be functionally connected to the electronic device through various interfaces. According to an embodiment of the present disclosure, the electronic device may further include a storage device (or storage medium) such as a hard drive.

The sensor module 840 may measure a physical quantity or detect an operation state of the electronic device and convert the measured or detected information into an electronic signal. The sensor module 840, for example, may include at least one of a gesture sensor 840A, a gyro sensor 840B, an atmospheric pressure sensor 840C, a magnetic sensor 840D, an acceleration sensor 840E, a grip sensor 840F, a proximity sensor 840G, a color sensor 840H (e.g., a Red, Green, and Blue (RGB) sensor), a biometric sensor 840I, a temperature/humidity sensor 840J, a light sensor 840K, and an ultraviolet (UV) sensor 840M. Additionally or alternatively, the sensor module 840, for example, may include an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scanner (not shown), and/or a fingerprint sensor (not shown). The sensor module 840 may further include a control circuit for controlling one or more sensors included therein.

The input module 850 (e.g., the input unit 140) may include a touch panel 852, a (digital) pen sensor 854, a key 856, or an ultrasonic input unit 858. The touch panel 852 that recognizes a touch input, for example, may include at least one of a capacitive touch panel, a resistive touch panel, an infrared touch panel, and an acoustic wave touch panel. The touch panel 852 may further include a control circuit. When the touch panel 852 is a capacitive touch panel, the touch panel 852 may recognize a physical contact or proximity. The touch panel 852 may also further include a tactile layer. In this case, the touch panel 852 may provide a tactile response to a user.

The (digital) pen sensor 854, for example, may be implemented using a means identical or similar to a means for receiving a touch input from a user or using a separate recognition sheet. The key 856, for example, may include a physical button, an optical key, or a keypad. The ultrasonic input unit 858 is a unit that can identify data by generating an ultrasonic signal through an input tool and detecting a sonic wave through a microphone in the electronic device, and is capable of wireless recognition. According to an embodiment of the present disclosure, the electronic device may also receive a user input from an external device (e.g., computer or server) connected thereto by using the communication module 820.

The display 860 (e.g., the display unit 130) may include a panel 862, a hologram unit 864, or a projector 866. The panel 862, for example, may be an LCD or an Active Matrix-Organic Light Emitting Diode (AM-OLED). The panel 862, for example, may be implemented to be flexible, transparent, or wearable. The panel 862 may also be incorporated into one module together with the touch panel 852. The hologram unit 864 may show a stereoscopic image in the air by using light interference. The projector 866 may display an image by projecting light onto a screen. The screen, for example, may be located inside or outside of the electronic device. The display 860 may further include a control circuit for controlling the panel 862, the hologram unit 864, or the projector 866.

The interface 870, for example, may include a High-Definition Multimedia Interface (HDMI) 872, a Universal Serial Bus (USB) 874, an optical interface 876, or a D-sub-miniature (D-sub) 878. Additionally or alternatively, the interface 870, for example, may include a mobile high-definition link (MHL) interface, an SD card/multimedia card (MMC) interface, or an infrared data association (IrDA) interface.

The audio module 880 may provide bidirectional conversion between a sound and an electronic signal. At least some elements of the audio module 880, for example, may be included in the input/output interface. The audio module 880, for example, may process sound information input or output through a speaker 882, a receiver 884, earphones 886, or the microphone 888.

The camera module 891 is a device that can take both still and moving images, and according to an embodiment of the present disclosure, may include one or more image sensors (e.g., a front sensor or a rear sensor, not shown), a lens (not shown), an image signal processor (ISP) (not shown), or a flash (e.g., an LED or xenon lamp, not shown).

The power management module 895 may manage power of the electronic device. Although not shown, the power management module 895, for example, may include a power management integrated circuit (PMIC), a charger IC, or a battery or fuel gauge.

The PMIC, for example, may be mounted in an IC or an SoC semiconductor. Charging methods may be classified into wired charging and wireless charging. The charger IC may charge a battery, and may prevent an overvoltage or excess current from being induced or flowing from a charger. According to an embodiment of the present disclosure, the charger IC may include a charger IC for at least one of wired charging and wireless charging. Examples of the wireless charging include magnetic resonance charging, magnetic induction charging, and electromagnetic charging, and an additional circuit such as a coil loop, a resonance circuit, and a rectifier may be added for the wireless charging.

The battery gauge, for example, may measure the residual capacity, charge in voltage, current, or temperature of the battery 896. The battery 896 may store or generate electricity, and may supply power to the electronic device by using the stored or generated electricity. The battery 896, for example, may include a rechargeable battery or a solar battery.

The indicator 897 may display a specific status of the electronic device or a part thereof (e.g., the AP 810), for example, a boot-up status, a message status, or a charging status. The motor 898 may convert an electrical signal into a mechanical vibration. Although not shown, the electronic device may include a processing unit (e.g., GPU) for supporting a mobile TV. The processing unit for supporting a mobile TV may process media data pursuant to a certain standard, for example, digital multimedia broadcasting (DMB), digital video broadcasting (DVB), or media flow.

Each of the above described elements of the electronic device according to embodiments of the present disclosure may be formed by one or more components, and the names of the corresponding elements may vary according to the type of the electronic device. The electronic device according to embodiments of the present disclosure may include at least one of the above described elements, and may exclude some of the elements or further include other additional elements. Further, some of the elements of the electronic device according to embodiments of the present disclosure may be coupled to form a single entity while performing the same functions as those of the corresponding elements before the coupling.

The term "module" as used in the present disclosure, for example, may mean a unit including one of hardware, software, and firmware or any combination of two or more of them. The "module", for example, may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing certain operations, which are now known or will be developed in the future.

According to an embodiment of the present disclosure, in the electronic device shown in FIG. 8, the camera module 891 may include the image sensor 125 having color pixels and phase detection pixels (e.g., upper phase sensors). The AP 810 (e.g., the control unit 100) may obtain image information and phase difference information through the image sensor 125, identify a plurality of pieces of distance information corresponding to a plurality of regions of the image information, based on the phase difference information, and process the image information, based on the plurality of pieces of distance information. According to an embodiment of the present disclosure, at least part of operations of the AP 810 may be included in the processor (e.g., ISP) having the camera module 891.

The electronic device according to various embodiments of the present disclosure may include an image sensor (e.g., the image sensor 125) including at least one phase detection pixel, and a control unit (e.g., the control unit 100) operatively coupled to the image sensor. The control unit may be configured to obtain image information and phase difference information about at least one subject through the image sensor, to identify a plurality of pieces of distance information corresponding to a plurality of regions associated with the image information, based on the phase difference information, and to process the image information, based on the distance information.

According to various embodiments of the present disclosure, the phase detection pixel may include a first focus region corresponding to a case where a focus for the subject is located at the image sensor, a second focus region corresponding to a case where the focus for the subject is located between the image sensor and the subject, and a third focus region corresponding to a case where the focus for the subject is located at the other region.

According to various embodiments of the present disclosure, the control unit may be further configured to, based on first phase difference information corresponding to a first region among the plurality of regions and second phase difference information corresponding to a second region among the plurality of regions, identify the distance information between the first and second regions. An image of the first focus region may be images of the first region, and images of the second and third focus regions may be images of the second region. The control unit may be further configured to obtain a plurality of pieces of phase difference information through a plurality of phase detection pixels corresponding to the first region, and to obtain the first phase difference information based on the plurality of pieces of phase difference information. The control unit may be further configured to blur-process at least one of the plurality of regions, based on the plurality of pieces of distance information.

According to various embodiments of the present disclosure, the control unit may be further configured to obtain a difference between first distance information corresponding to a focused first region among the plurality of regions and second distance information corresponding to a non-focused second region among the plurality of regions, to perform a first blur processing for the second region when the difference is in a first range, and to perform a second blur processing for the second region when the difference is in a second range. In this case, the control unit may be further configured to perform a Gaussian blur processing for at least part of a boundary between the first and second regions when the first and second regions are adjacent to each other.

According to various embodiments of the present disclosure, the control unit may be further configured to perform a first image processing for a first region among the plurality of regions corresponding to first distance information among the plurality of pieces of distance information, and to perform a second image processing for a second region among the plurality of regions corresponding to second distance information among the plurality of pieces of distance information. The control unit may be further configured to perform a third image processing for a part of at least one of the first and second regions when the first and second regions are adjacent to each other. At least one of the first image processing and the second image processing may include at least one of a brightness adjustment processing, a contrast adjustment processing, a sharpen processing, a blur processing, a black-and-white processing, a color adjustment processing, a deletion processing, a replacement processing, and an image addition processing.

Figure 9:
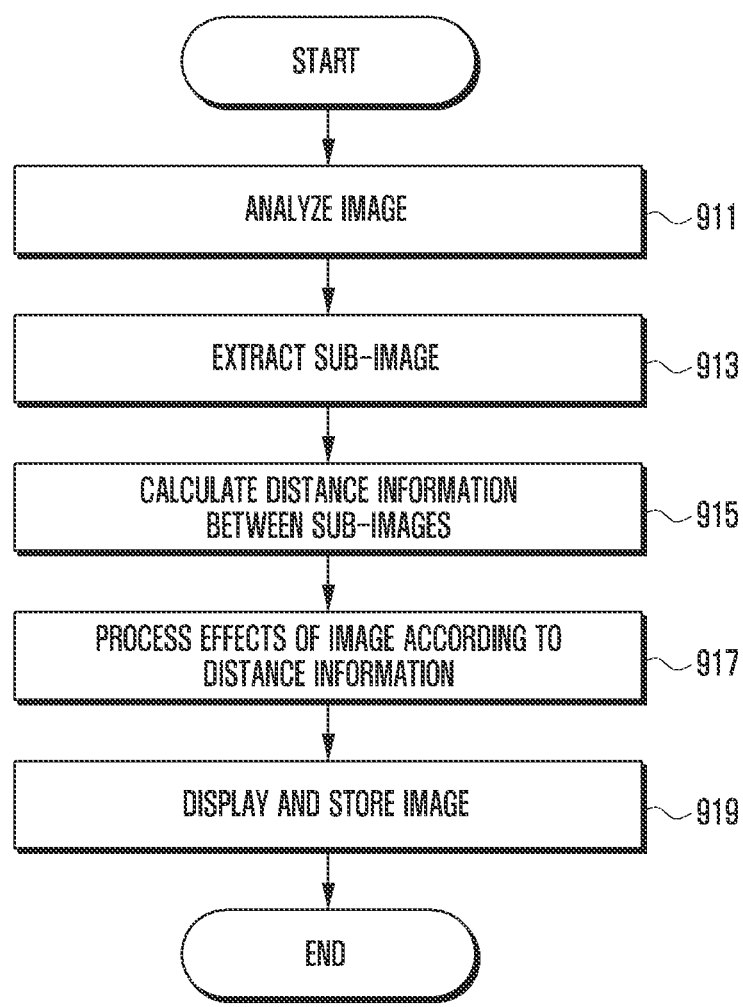
FIG. 9 is a flow diagram illustrating a method for processing images in response to relative locations of subjects in an electronic device according to various embodiments of the present disclosure.

FIG. 9 is a flow diagram illustrating a method for processing images in response to relative locations of subjects in an electronic device according to various embodiments of the present disclosure.

Referring to FIG. 9, the control unit 100 may analyze an image at operation 911. The control unit 100 may identify subjects contained in an image. This image may be any image captured through the image device 120. The image may be downloaded from an external device or server through the communication unit. The captured or downloaded image may be stored in the memory unit 110.

At operation 913, the control unit 100 may extract sub-images from the subjects contained in the image. At operation 915, the control unit 100 may calculate a relative distance between the extracted sub-images. In case of a captured image, the control unit 100 may calculate this distance by using phase difference values outputted from the phase detection pixels of the image sensor 125. The phase difference values may have different values according to distances of the sub-images forming the captured photo image. According to an embodiment of the present disclosure, the control unit 100 may analyze the outputs of the phase detection pixels disposed at positions of the sub-images, and find relative distance information between a sub-image at a focus position and any other sub-image at other position. At operation 917, the control unit 100 may process a predetermined effect for each sub-image of the captured photo image, using the relative distance information between the sub-images. This predetermined effect may be one of various effects, e.g., a blur processing effect. At operation 919, the control unit 100 may display the processed photo image on the display unit 130 and store it in the memory unit 110.

Hereinafter, it will be supposed that an image effect is a blur processing effect and an image is captured by the image device 120. However, even in case an image downloaded from an external device or server or stored in the memory unit 110, a specific image containing phase difference values or relative distance information of sub-images may be processed with a required image effect.

Figure 10:
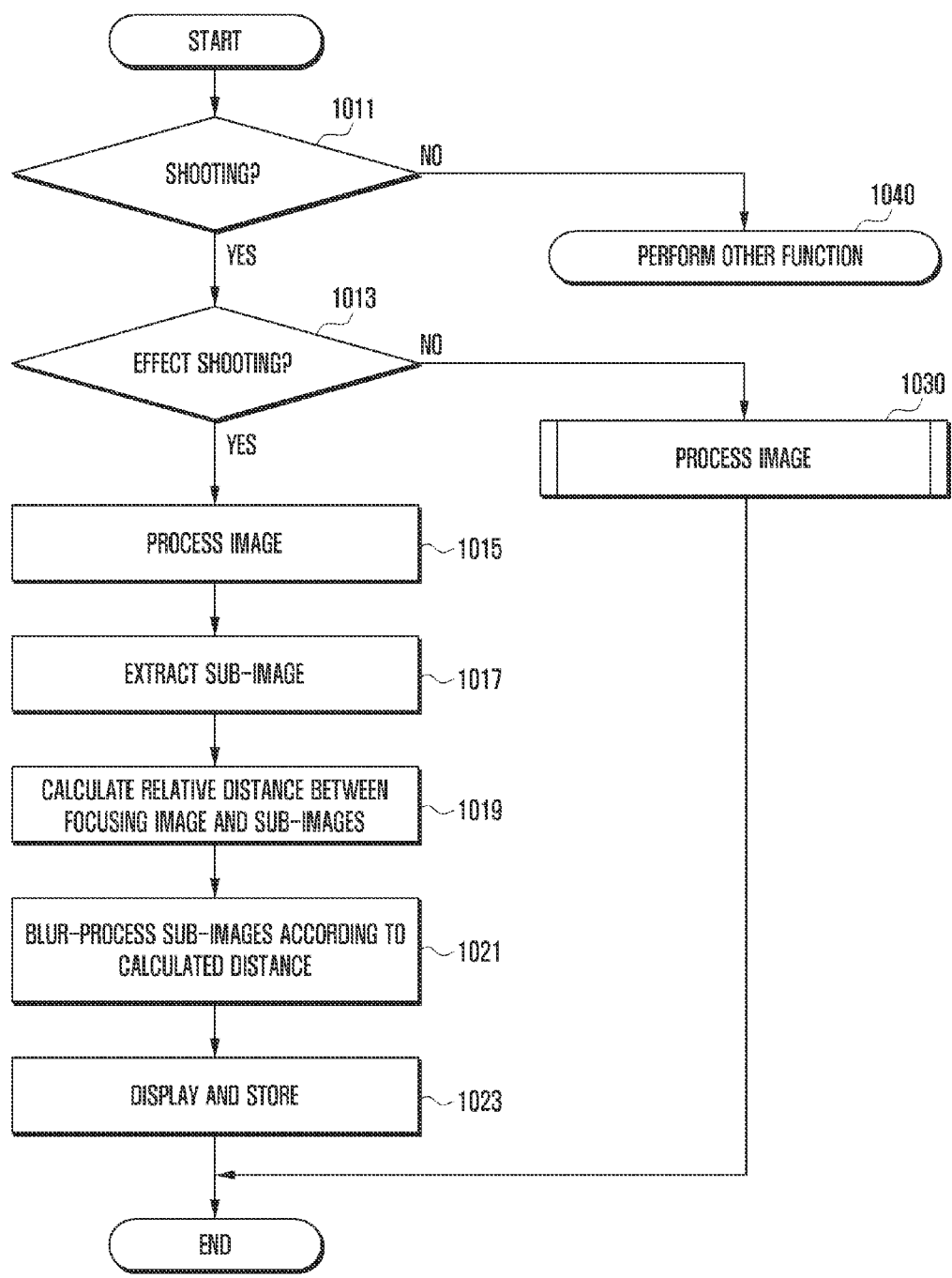
FIG. 10 is a flow diagram illustrating a process of extracting a relative distance between sub-images contained in an image captured by an electronic device interworking with an image device and then processing a blur effect according to various embodiments of the present disclosure.

FIG. 10 is a flow diagram illustrating a process of extracting a relative distance between sub-images contained in an image captured by an electronic device interworking with an image device and then processing a blur effect according to various embodiments of the present disclosure.

Referring to FIG. 10, the electronic device may have a blur shooting mode for extracting a distance between subjects and blur-processing a captured image. For example, the blur shooting mode may be set up in a driving state of the image device. When the blur shooting mode is selected, the control unit 100 may recognize the blur shooting mode through operations 1011 and 1013. If the blur shooting mode is recognized, the control unit 100 receives photo images from the color pixel sensors of the image sensor 125 and then processes the photo images at operation 1015. A photo image processing may include a pre-processing and a post-processing, and the processed photo image may be stored temporarily in the buffer.

At operation 1017, the control unit 100 may extract sub-images from subjects contained in the photo image. The extracted sub-images may be a target of blur-processing based on relative distance information. At operation 1019, the control unit 100 may receive phase difference values from the phase detection pixels of the image sensor 125, and calculate a relative distance between the sub-images extracted using the phase difference values. The phase difference values may have different values depending on a distance between the sub-images forming the captured photo image. In a distance calculation, the control unit 100 may analyze the outputs of the phase detection pixels disposed at positions of the sub-images, and find relative distance information between sub-images at a focus position and sub-images at other positions. Thereafter, at operation 1021, the control unit 100 may select blur control data corresponding to a relative distance information value between the sub-images from a depth map table having blur control data, and blur-process the sub-images of the photo image according to the selected blur control data.

The control unit 100 may perform a blur processing of the photo image for each sub-image, and a specific sub-image located at a focus position may be not blur-processed. At operation 1021, the control unit 100 may set blur control data of sub-images according to a relative distance value between a sub-image of a focus position and any other sub-image in the depth map table (or referred to as a blur control data table), and perform a blur processing of the sub-images corresponding to the set blur control data. A sub-image close to that of the focus position (e.g., having a small distance information value) may have a smaller value of blur control data than a sub-image far from that of the focus position (e.g., having a great distance information value). Blur control data having a greater distance may have a higher weight value. Alternatively, sub-images having greater distance information values may have smaller blur values. In this case, since a sub-image closer to that of the focus position has a greater blur, an out focusing effect may be increased.

In case the focus position is placed at a middle position sub-image, a blur processing may be equally performed for sub-images in the front or rear of a focus in proportion to distance information values. For example, referring to FIG. 6D, regardless of being smaller (in case where the focus position is placed in the front of a sub-image) or greater (in case where the focus position is placed in the rear of a sub-image) than a gap of images projected on the focus position, out focusing may be controlled in the same manner according to extracted distance information values. In case of having the same distance information, the control unit 100 may perform a higher (or smaller) blur processing for a sub-image having a front focus position than for a sub-image having a rear focus position. In such a blur processing, a particular blur value may be given to a specific sub-image selected by a user. The control unit 100 may blur-process a certain region, having no sub-image in the photo image, with a higher value than blur control data of the sub-image.

After the above blur processing of the captured photo image according to a relative distance between sub-images, at operation 1023 the control unit 100 may display the blur-processed photo image on the display unit 130 and store it (preferably compressed and encoded) in the memory unit 110.

Meanwhile, if it is not a blur shooting at operation 1013, the control unit 100 performs a shooting operation of a predetermined mode at operation 1030. This shooting mode may be a still image capture mode, a video recording mode, or the like. If it is not a shooting mode at operation 1011, another function is performed at operation 1040.

Figure 11:
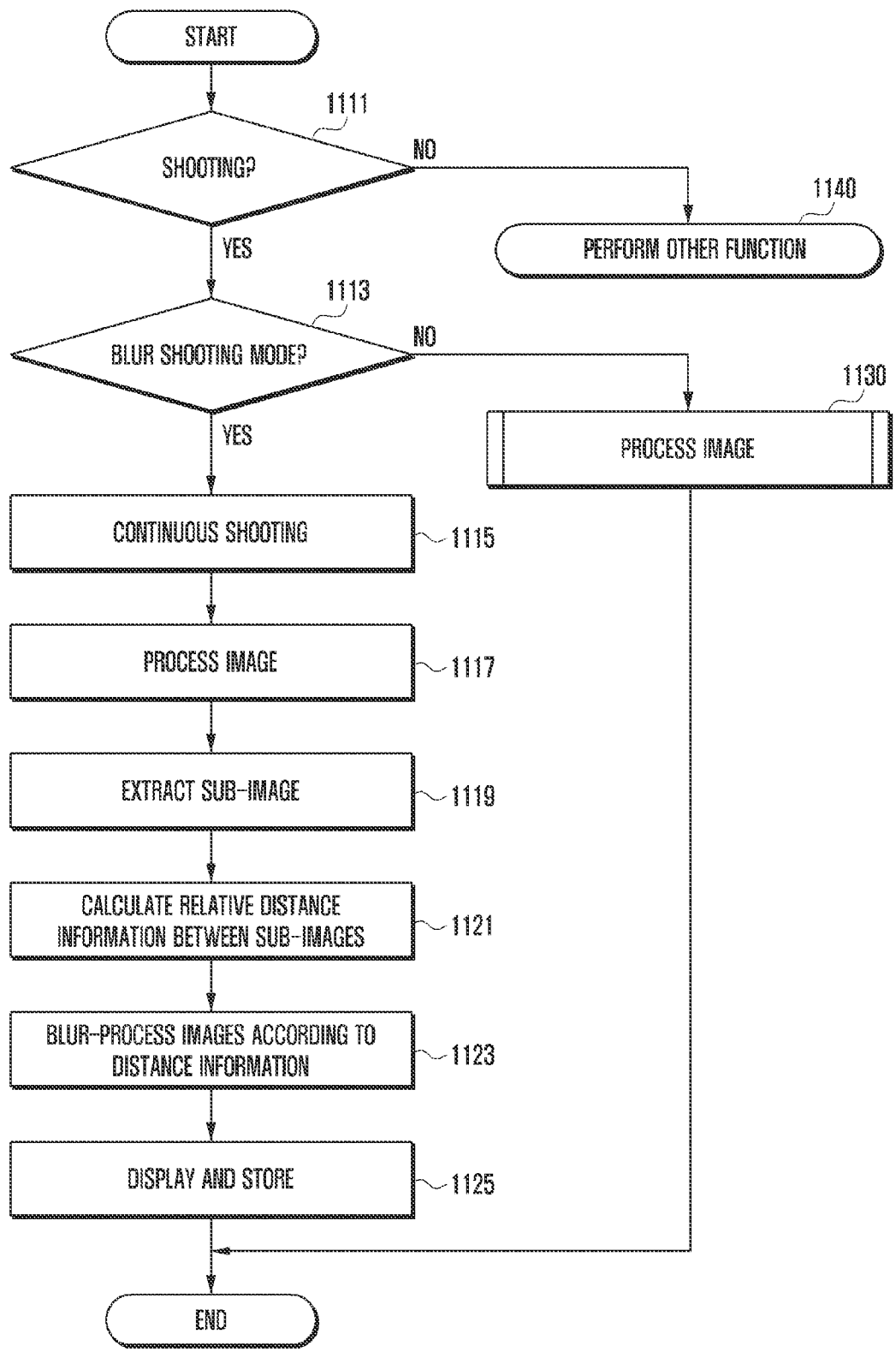
FIG. 11 is a flow diagram illustrating a method for processing a blur effect by extracting a relative distance between sub-images contained in an image captured by an electronic device interworking with an image device according to various embodiments of the present disclosure.

FIG. 11 is a flow diagram illustrating a method for processing a blur effect by extracting a relative distance between sub-images contained in an image captured by an electronic device interworking with an image device according to various embodiments of the present disclosure.

Referring to FIG. 11, at a blur shooting, the control unit 100 finds relative distance information between sub-images, determines a blur value, blur-processes the sub-images of a photo image. In this case, the control unit 100 should extract the sub-images from the captured photo image. For an exact extraction of sub-images, a blur shooting may employ a continuous shooting technique focusing respective subjects in the photo image.

When a blur shooting mode is selected, the control unit 100 may recognize the blur shooting mode through operations 1111 and 1113. If the blur shooting mode is recognized, the control unit 100 drives the image device 120 and performs a continuous shooting with focusing respective subjects contained in the photo image at operation 1115. The image device 120 may continuously capture photo images with auto-focusing on respective subjects detected in the image sensor 125 under the control of the control unit 100, or a user may perform a continuous shooting while manually focusing on subjects located within a view finder. Such respective subjects may be difference subjects and become sub-images.

When the continuous shooting operation is performed by the image device 120, the color pixel sensors of the image sensor 125 continuously obtains photo images and the control unit 100 receives and processes the continuously obtained photo images at operation 1117. This photo image processing may include a pre-processing and a post-processing, and the processed photo image may be stored temporarily in the buffer.

At operation 1119, the control unit 100 extracts, as sub-images, focused subjects from continuously obtained and buffered photo images. At operation 1121, the control unit 100 receives phase difference values from the phase detection pixels of the image sensor 125, and calculates a relative distance between the sub-images extracted using the phase difference values. A non-blur-processed image (a basic sub-image) may be set up by a user or as a default. A basic sub-image set by a user may be an initially focused subject image. A basic sub-image set as a default may be a centrally located sub-image in the photo image.

At operation 1121, the control unit 100 calculates a relative distance between the basic sub-image and the other sub-images. The phase detection pixel of the image sensor 125 outputs different phase difference values depending on a distance between the sub-images forming the captured photo image. In a distance calculation, the control unit 100 analyzes the outputs of the phase detection pixels disposed at positions of the sub-images, and finds relative distance information between sub-images at a focus position and sub-images at other positions. At operation 1123, the control unit 100 selects blur control data corresponding to a relative distance information value between the sub-images from a depth map table having blur control data, and blur-processes the sub-images of the photo image according to the selected blur control data.

The control unit 100 may perform a blur processing of the photo image for each sub-image, and a specific sub-image located at a focus position may be not blur-processed. At operation 1121, the control unit 100 sets blur control data of sub-images according to a relative distance value between a sub-image of a focus position and any other sub-image in the depth map table, and blur-processes the sub-images corresponding to the set blur control data. A sub-image close to that of the focus position (e.g., having a small distance information value) may have a smaller value of blur control data than a sub-image far from that of the focus position (e.g., having a great distance information value). The control unit 100 may blur-process a certain region, having no sub-image in the photo image, with a higher value than blur control data of the sub-image.

After the above blur processing of the captured photo image according to a relative distance between sub-images, at operation 1125 the control unit 100 may display the blur-processed photo image on the display unit 130 and store the photo image (which may be compressed and encoded) in the memory unit 110. The control unit 100 may store all continuously captured photo images and also store distance information values between sub-images. If a user select a photo image having a different focus position and then triggers a blur function, the control unit 100 may perform again the above-discussed operations 1117 to 1125.

If a blur shooting is not performed at operation 1113, the control unit 100 performs a shooting operation of a predetermined mode at operation 1130. This shooting mode may be a still image capture mode, a video recording mode, or the like. If a shooting mode is not performed at operation 1111, another function is performed at operation 1140.

According to various embodiments of the present disclosure, an image processing method of an electronic device may include an operation of obtaining image information and phase difference information about at least one subject through an image sensor including at least one phase detection pixel, an operation of identifying a plurality of pieces of distance information corresponding to a plurality of regions associated with the image information, based on the phase difference information, and an operation of processing the image information, based on the distance information.

According to various embodiments of the present disclosure, the image information about the subject may include image information about a first focus region where a focus for the subject is located at the image sensor, image information about a second focus region where the focus for the subject is located between the image sensor and the subject, and image information about a third focus region where the focus for the subject is located at the other region.

According to various embodiments of the present disclosure, the operation of identifying the plurality of pieces of distance information may include, based on first phase difference information corresponding to a first region among the plurality of regions and second phase difference information corresponding to a second region among the plurality of regions, identifying the distance information between the first and second regions. The first region may be the first focus region, and the second region may be the second focus region and the third focus region. The first phase difference information may be obtained based on a plurality of pieces of phase difference information which are obtained through a plurality of phase detection pixels corresponding to the first region. The operation of processing the image information may include blur-processing at least one of the plurality of regions, based on the plurality of pieces of distance information.

According to various embodiments of the present disclosure, the operation of identifying the plurality of pieces of distance information may include identifying a difference between first distance information corresponding to a focused first region among the plurality of regions and second distance information corresponding to a non-focused second region among the plurality of regions, and the operation of processing the image information may include performing a first blur processing for the second region when the difference is in a first range, and performing a second blur processing for the second region when the difference is in a second range. The blur processing may include a Gaussian blur processing for at least part of a boundary between the first and second regions when the first and second regions are adjacent to each other.

According to various embodiments of the present disclosure, the operation of processing the image information may include performing a first image processing for a first region among the plurality of regions corresponding to first distance information among the plurality of pieces of distance information, and performing a second image processing for a second region among the plurality of regions corresponding to second distance information among the plurality of pieces of distance information. At least one of the first image processing and the second image processing may include at least one of a brightness adjustment processing, a contrast adjustment processing, a sharpen processing, a blur processing, a black-and-white processing, a color adjustment processing, a deletion processing, a replacement processing, and an image addition processing.

Figure 12:
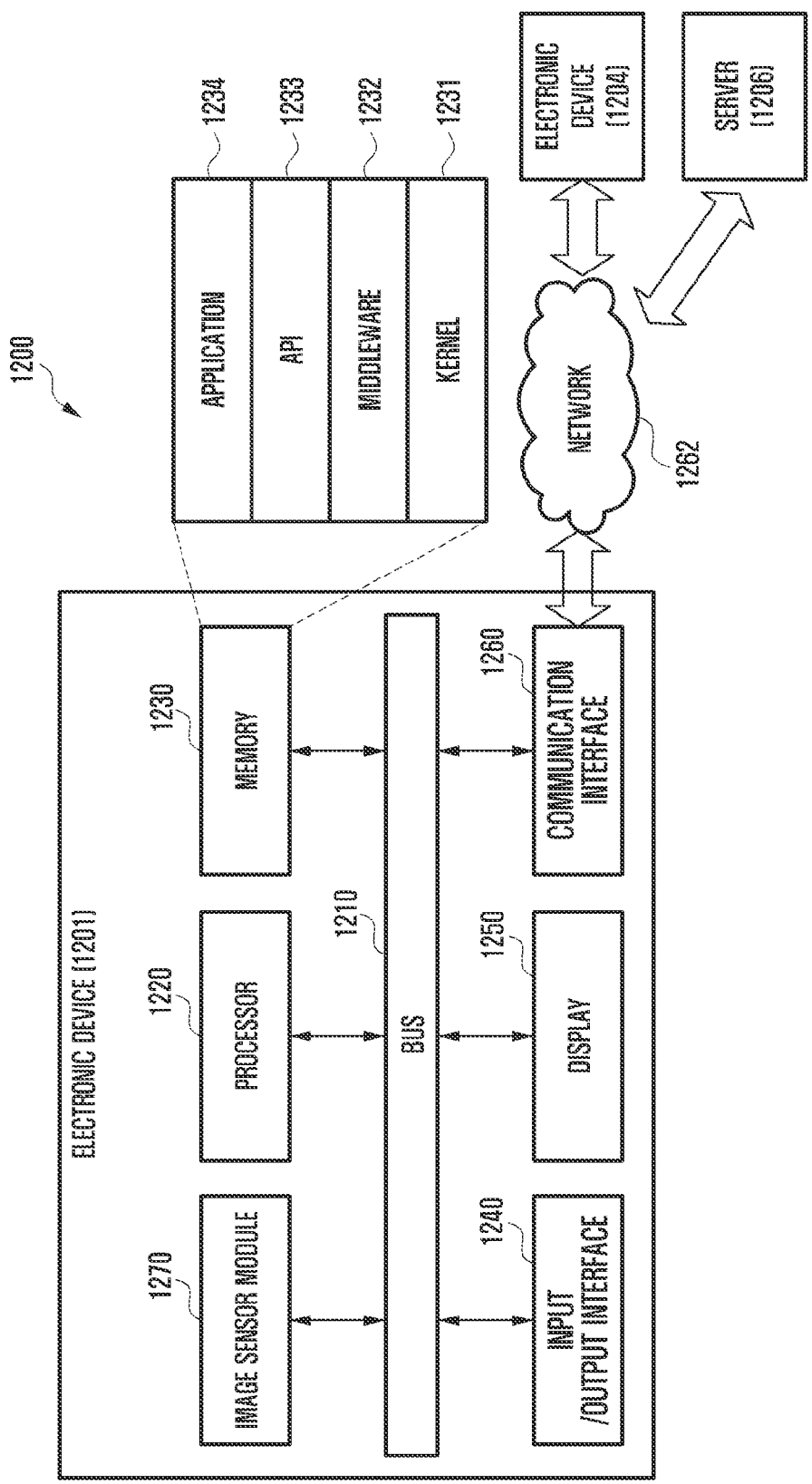
FIG. 12 illustrates a network environment including an electronic device according to various embodiments of the present disclosure.

FIG. 12 illustrates a network environment including an electronic device according to various embodiments of the present disclosure.

Referring to FIG. 12, the network environment 1200 includes an electronic device 1201, an electronic device 1204, a server 1206, and a network 1262. The electronic device 1201 may include a bus 1210, a processor 1220, a memory 1230, an input/output interface 1240, a display 1250, a communication interface 1260, and an image sensor module 1270.

The bus 1210 may be a circuit interconnecting the aforementioned components and transmitting communication (e.g., a control message) between the aforementioned components.

The processor 1220, for example, may receive instructions from the aforementioned components (e.g., the memory 1230, the input/output interface 1240, the display 1250, the communication interface 1260, and the image sensor module 1270) other than the processor 1220 through the bus 1210, decode the received instructions, and perform operations or data processing according to the decoded instructions.

The memory 1230 may store instructions or data received from or generated by the processor 1220 or other components (e.g., the input/output interface 1240, the display 1250, the communication interface 1260, and the image sensor module 1270). The memory 1230 may include programming modules, for example, a kernel 1231, middleware 1232, an application programming interface (API) 1233, and applications 1234. Each of the programming modules as described above may be formed by software, firmware, hardware, or a combination of two or more thereof.

The kernel 1231 may control or manage system resources (e.g., the bus 1210, the processor 1220, and the memory 1230) used to execute operations or functions implemented in the remaining other programming modules, for example, the middleware 1232, the API 1233, and the applications 1234. Further, the kernel 1231 may provide an interface that allows the middleware 1232, the API 1233, or the applications 1234 to access and control or manage individual components of the electronic device 1201.

The middleware 1232 may serve to mediate between the API 1233 or the applications 1234 and the kernel 1231, (i.e., allow the API 1233 or the application 1234 to communicate and exchange data with the kernel 1231). The middleware 1232 may perform control (e.g., scheduling or load balancing) for task requests received from the applications 1234 by using, for example, a method of assigning a priority for use of the system resource (e.g., the bus 1210, the processor 1220, or the memory 1230) of the electronic device 1201 to at least one of the applications 1234.

The API 1233 is an interface for allowing the applications 1234 to control functions provided by the kernel 1231 and the middleware 1232, and may include at least one interface or function (e.g., instruction) for, for example, file control, window control, image processing, or text control.

According to various embodiments of the present disclosure, the applications 1234 may include an SMS/Multimedia Message Service (MMS) application, an e-mail application, a calendar application, an alarm application, a health care application (e.g., an application for measuring the amount of exercise or blood glucose), and an environmental information application (e.g., an application for providing atmospheric pressure information, humidity information, temperature information, and the like). Additionally or alternatively, the applications 1234 may include an application associated with information exchange between the electronic device 1201 and an external electronic device (e.g., the electronic device 1204). The application associated with information exchange, for example, may include a notification relay application for transferring specific information to the external electronic device or a device management application for managing the external electronic device.

For example, the notification relay application may include a function of transferring notification information, generated in another application of the electronic device 1201 (e.g., the SMS/MMS application, the e-mail application, the health care application, or the environmental information application), to an external electronic device (e.g., the electronic device 1204). Additionally or alternatively, the notification relay application, for example, may receive notification information from an external electronic device (e.g., the electronic device 1204) and provide the received notification information to a user. The device management application, for example, may manage (e.g., install, remove, or update) a function for at least a part of an external electronic device (e.g., the electronic device 1204) communicating with the electronic device 1201 (e.g., a function of turning on/off an external electronic device itself (or some components thereof) or adjusting the brightness (or resolution) of a display), an application running on the external electronic device, or a service provided in the external electronic device (e.g., a calling or messaging service).

According to various embodiments of the present disclosure, the applications 1234 may include an application specified according to the attribute (e.g., type) of an external electronic device (e.g., the electronic device 1204). For example, when the external electronic device is an MP3 player, the applications 1234 may include an application associated with music playback. Similarly, when the external electronic device is a mobile medical device, the applications 1234 may include an application associated with health care. According to an embodiment of the present disclosure, the applications 1234 may include at least one of an application assigned to the electronic device 101 and an application received from an external electronic device (e.g., the server 1206 or the electronic device 1204).

According to various embodiments of the present disclosure, the application 1234 may execute operations which are obtaining image information and phase difference information about at least one subject through the image sensor, identifying a plurality of pieces of distance information corresponding to a plurality of regions associated with the image information based on the phase difference information, and processing the image information based on the distance information The input/output interface 1240, for example, may transfer instructions or data, input from a user through an input/output device (e.g., a sensor, a keyboard, or a touch screen), to the processor 1220, the memory 1230, the communication interface 1260, or the image sensor module 1270 through the bus 1210. For example, the input/output interface 1240 may provide the processor 1220 with data corresponding to a user's touch input through a touch screen. Further, the input/output interface 1240 may, for example, receive instructions or data from the processor 1220, the memory 1230, the communication interface 1260, or the image sensor module 1270 through the bus 1210 and output the received instructions or data through the input/output device (e.g., a speaker or a display). For example, the input/output interface 1240 may output voice data processed by the processor 1220 to a user through a speaker. The display 1250 may display various pieces of information (e.g., multimedia data or text data) to a user.

The communication interface 1260 may establish communication between the electronic device 1201 and an external electronic device (e.g., the electronic device 1204 or the server 1206). For example, the communication interface 1260 may be connected to the network 1262 through wireless or wired communication and thereby communicate with the external device. The wireless communication, for example, may include at least one of WiFi, BT, NFC, GPS, and cellular communication (e.g., LTE, LTE-A, CDMA, CDMA, UMTS, WiBro, or GSM). The wired communication, for example, may include at least one of a USB, an HDMI, Recommended Standard 232 (RS-232), and a plain old telephone service (POTS).

According to an embodiment of the present disclosure, the network 1262 may be a telecommunications network. The telecommunications network may include at least one of a computer network, the Internet, the Internet of things, and a telephone network. According to an embodiment of the present disclosure, a protocol (e.g., a transport layer protocol, a data link layer protocol, or a physical layer protocol) for communication between the electronic device 1201 and an external device may be supported by at least one of the applications 1234, the application programming interface 1233, the middleware 1232, the kernel 1231, and the communication interface 1260.

According to an embodiment of the present disclosure, the image sensor module 1270 may include, for example, a phase detection pixel (also referred to as a phase difference detection pixel). The image sensor module 1270 may obtain a relative distance between subjects through the phase detection pixels.

As fully discussed hereinbefore, an image processing apparatus and method according to various embodiments of the present disclosure may detect a distance to each subject through the image sensor including the phase detection pixels, find a relative distance between subjects, and perform various types of image processing to images on the basis of the relative distance between the subjects.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
    an image sensor including at least one phase detection pixel; and
    at least one processor operatively coupled to the image sensor,
    wherein the at least one processor configured to:
        obtain image information and phase difference information about at least one subject through the image sensor,
        determine a plurality of pieces of distance information between each of a plurality of regions and the at least one subject associated with the image information based on the phase difference information, and process the image information based on the distance information between each of the plurality of regions and the at least one subject associated with the image information.

2. The device of claim 1, wherein the phase detection pixel comprises:
a first focus region corresponding to a case where a focus for the at least one subject is located at the image sensor;
a second focus region corresponding to a case where the focus for the at least one subject is located between the image sensor and the at least one subject; and
a third focus region corresponding to a case where the focus for the at least one subject is located at another region.

3. The device of claim 1, wherein the at least one processor is further configured to, based on first phase difference information corresponding to a first region among the plurality of regions and second phase difference information corresponding to a second region among the plurality of regions, identify the distance information between the first and second regions.

4. The device of claim 3, wherein the at least one processor is further configured to:
obtain a plurality of pieces of phase difference information through a plurality of phase detection pixels corresponding to the first region, and
obtain the first phase difference information based on the plurality of pieces of phase difference information.

5. The device of claim 1, wherein the at least one processor is further configured to blur-process at least one of the plurality of regions, based on the plurality of pieces of distance information.

6. The device of claim 1, wherein the at least one processor is further configured to:
obtain a difference between first distance information corresponding to a focused first region among the plurality of regions and second distance information corresponding to a non-focused second region among the plurality of regions,
perform a first blur processing for the second region when the difference is in a first range, and
perform a second blur processing for the second region when the difference is in a second range.

7. The device of claim 6, wherein the at least one processor is further configured to perform a Gaussian blur processing for at least part of a boundary between the first and second regions when the first and second regions are adjacent to each other.

8. The device of claim 1, wherein the at least one processor is further configured to:
perform a first image processing for a first region among the plurality of regions corresponding to first distance information among the plurality of pieces of distance information, and
perform a second image processing for a second region among the plurality of regions corresponding to second distance information among the plurality of pieces of distance information.

9. The device of claim 8, wherein the at least one processor is further configured to perform a third image processing for a part of at least one of the first and second regions when the first and second regions are adjacent to each other.

10. The device of claim 8, wherein at least one of the first image processing and the second image processing includes at least one of a brightness adjustment processing, a contrast adjustment processing, a sharpen processing, a blur processing, a black-and-white processing, a color adjustment processing, a deletion processing, a replacement processing, or an image addition processing.

11. An image processing method of an electronic device, the method comprising:
obtaining image information and phase difference information about at least one subject through an image sensor including at least one phase detection pixel;
determining a plurality of pieces of distance information between each of a plurality of regions and the at least one subject associated with the image information based on the phase difference information; and
processing the image information based on the distance information between each of the plurality of regions and the at least one subject associated with the image information.

12. The method of claim 11, wherein the image information about the at least one subject includes:
image information about a first focus region where a focus for the at least one subject is located at the image sensor,
image information about a second focus region where the focus for the at least one subject is located between the image sensor and the at least one subject, and
image information about a third focus region where the focus for the at least one subject is located at another region.

13. The method of claim 12, wherein the determining of the plurality of pieces of the distance information comprises:
based on first phase difference information corresponding to a first region among the plurality of regions and second phase difference information corresponding to a second region among the plurality of regions, computing the distance information between the first and second regions; and
wherein the first region is the first focus region, and the second region is the second focus region and the third focus region.

14. The method of claim 13, wherein the first phase difference information is obtained based on a plurality of pieces of phase difference information which are obtained through a plurality of phase detection pixels corresponding to the first region.

15. The method of claim 14, wherein the processing of the image information includes blur-processing at least one of the plurality of regions based on the plurality of pieces of the distance information.

16. The method of claim 11,
wherein the determining of the plurality of pieces of the distance information comprises:
identifying a difference between first distance information corresponding to a focused first region among the plurality of regions and second distance information corresponding to a non-focused second region among the plurality of regions; and
wherein the processing of the image information comprises:
performing a first blur processing for the second region when the difference is in a first range, and
performing a second blur processing for the second region when the difference is in a second range.

17. The method of claim 16, wherein the blur processing includes a Gaussian blur processing for at least part of a boundary between the first and second regions when the first and second regions are adjacent to each other.

18. The method of claim 11, wherein the processing of the image information includes:
- performing a first image processing for a first region among the plurality of regions corresponding to first distance information among the plurality of pieces of the distance information; and
- performing a second image processing for a second region among the plurality of regions corresponding to second distance information among the plurality of pieces of the distance information.

19. The method of claim 18, wherein at least one of the first image processing and the second image processing includes at least one of a brightness adjustment processing, a contrast adjustment processing, a sharpen processing, a blur processing, a black-and-white processing, a color adjustment processing, a deletion processing, a replacement processing, or an image addition processing.

20. An electronic device comprising:
- an image sensor including at least one phase detection pixel; and
- at least one processor operatively coupled to the image sensor, wherein the at least one processor configured to:
- obtain image information about at least one subject through the image sensor,
- obtain first phase difference information corresponding to a first region and second phase difference information corresponding to a second region among a plurality of regions associated with the image information through the at least one phase detection pixel,
- determine a blur processing for at least one of the first and second regions, based on the first phase difference information and the second phase difference information,
- compute relative distance information between the first and second regions based on the first and second phase difference information,
- determine blur control data based on the relative distance information, and
- determining the blur processing based on the blur control data.

* * * * *